United States Patent
Tanaka et al.

(10) Patent No.: US 7,718,232 B2
(45) Date of Patent: May 18, 2010

(54) NEMATIC LIQUID CRYSTAL COMPOSITION AND LIQUID CRYSTAL DISPLAY ELEMENT THAT USED THE COMPOSITION

(75) Inventors: Yoshikiyo Tanaka, Yotsukaido (JP); Kiyofumi Takeuchi, Tokyo (JP); Haruyoshi Takatsu, Tokyo (JP)

(73) Assignee: Dainippon Ink & Chemical, Inc., Tokyo (JP)

( * ) Notice: Subject to any disclaimer, the term of this patent is extended or adjusted under 35 U.S.C. 154(b) by 680 days.

(21) Appl. No.: 10/540,033

(22) PCT Filed: Dec. 19, 2003

(86) PCT No.: PCT/JP03/16376

§ 371 (c)(1),
(2), (4) Date: Jan. 23, 2008

(87) PCT Pub. No.: WO2004/058917

PCT Pub. Date: Jul. 15, 2004

(65) Prior Publication Data
US 2008/0149889 A1 Jun. 26, 2008

(30) Foreign Application Priority Data

Dec. 26, 2002 (JP) ............... 2002-376844
Jan. 27, 2003 (JP) ............... 2003-017294

(51) Int. Cl.
*C09K 19/32* (2006.01)
*C09K 19/30* (2006.01)
*C09K 19/12* (2006.01)

(52) U.S. Cl. ............. 428/1.1; 252/299.62; 252/299.63; 252/299.66

(58) Field of Classification Search ............. 252/299.62, 252/299.63, 299.66; 428/1.1
See application file for complete search history.

(56) References Cited

FOREIGN PATENT DOCUMENTS

| | | |
|---|---|---|
| DE | 195 22 167 A1 | 12/1995 |
| DE | 19522195 | 12/1995 |
| DE | 197 48 434 A1 | 5/1999 |
| EP | 1 116 770 A1 | 7/2001 |
| JP | 8-104869 | 4/1996 |
| JP | 10-176167 | 6/1998 |
| JP | 11-140447 | 5/1999 |
| JP | 11-242225 | 9/1999 |
| JP | 2001-40354 | 2/2001 |
| JP | 2001-72974 | 3/2001 |
| JP | 2001-192657 | 7/2001 |
| JP | 2001-316669 | 11/2001 |
| JP | 2002-69449 | 3/2002 |
| JP | 2002-201474 | 7/2002 |

OTHER PUBLICATIONS

English translation for JP 2001-40354 by computer, http://www4.ipdl.inpit.go.jp/Tokujitu/PAJdetail.ipdl?N0000=60&N0120=01&N2001=2&N3001=2001-040354.*

* cited by examiner

*Primary Examiner*—Shean C Wu
(74) *Attorney, Agent, or Firm*—Edwards Angell Palmer & Dodge LLP

(57) ABSTRACT

A nematic liquid crystal composition having a negative dielectric constant anisotropy, comprising one or more compounds selected from the compounds represented by (IA) and (IB) of 10-70% by mass, one or more compounds selected from the compounds represented by (IIA) to (IID) of 10-70% by mass, the total content of one or more compounds selected from the compounds represented by (IA) to (IID) being 35-80% by mass, and a compound represented by (III) of 20-65% by mass:

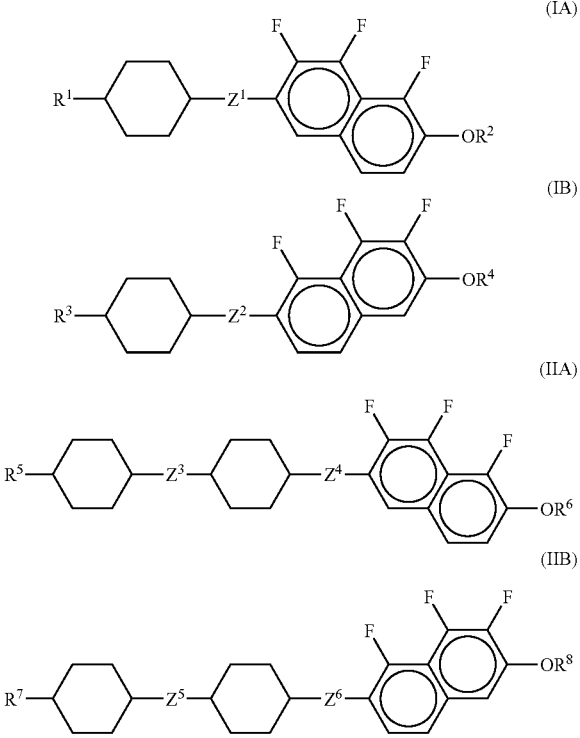

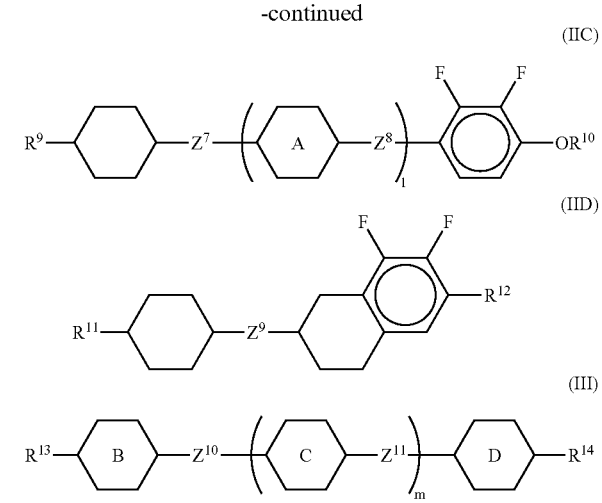

wherein $R^1$ to $R^{14}$ each independently represents an alkyl group having 1 to 10 carbon atoms, etc.; $Z^1$ to $Z^{11}$ each independently represents a single bond, etc.; $Z^1$ to $Z^6$ and $Z^9$ to $Z^{11}$ each independently represents —$CF_2O$—, etc.; l and m represent 0 or 1; rings A, B, C and D represent a trans-1,4-cyclohexylene group, etc.; and rings B, C and D represent a trans-1,4-cyclohexenylene group.

21 Claims, 3 Drawing Sheets

NEMATIC LIQUID CRYSTAL COMPOSITION AND LIQUID CRYSTAL DISPLAY ELEMENT THAT USED THE COMPOSITION

TECHNICAL FIELD

The present invention relates to a nematic liquid crystal composition having a negative dielectric constant anisotropy, which have various physical properties most suited for a liquid crystal display device (element), and a liquid crystal display device that used the composition.

BACKGROUND ART

TN (Twisted Nematic) type liquid crystal display devices and STN (Super Twisted Nematic) type liquid crystal display devices, which are now widely used, are inferior in view angle characteristics because electrochemical characteristics vary with a view angle, thus causing a large problem in applications such as TV in which view angle characteristics are considered to be important. As a method of attaining a wider view angle, a VA (Vertically aligned) system (VA mode) (see Non-Patent Document 1), an IPS (In-Plane Switching) system (IPS mode) (see Non-Patent Document 2) and an ECB (electrically controlled birefringence) system (ECB mode) have been proposed up to the present. As a liquid crystal material used in VA-LCD (Vertically Aligned Liquid Crystal Display), a liquid crystal material having a negative dielectric constant anisotropy is required, unlike TN type and STN type liquid crystal display devices (see Patent Document 1) and the following characteristics are required: 1. high response speed, 2. high nematic phase-isotropic liquid phase transition temperature ($T_{N-I}$), and 3. low nematic phase-isotropic liquid phase transition temperature. That is, there is required a display which has higher-speed responsibility to a desired driving voltage and is more stable within a wider temperature range. It is also considered to be important that electrostatic capacity of TFT element causes less variation on driving of a liquid crystal. In case of the same driving voltage, it is required to develop a liquid crystal which exhibits a negative dielectric constant anisotropy having a smaller absolute value or more steep electrochemical characteristics. Furthermore, there is required a liquid crystal composition having a higher nematic phase-isotropic liquid phase transition temperature ($T_{N-I}$) and a lower viscosity, capable of driving at a low voltage.

To solve the above problems, there have been employed the following liquid crystal materials having a 2,3-difluorophenyl group (see Patent Documents 2 to 7):

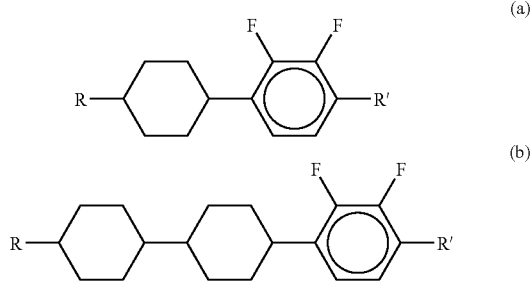

wherein R and R' represent an alkyl group or an alkoxy group.

The compound represented by the general formula (a) shows a high absolute value of the negative dielectric constant anisotropy, however, a liquid crystal composition using a large amount of this compound has such a problem as to decrease the nematic phase-isotropic liquid phase transition temperature ($T_{N-I}$). The liquid crystal composition using the compound represented by the general formula (b) has comparatively high nematic phase-isotropic liquid phase transition temperature ($T_{N-I}$), but has such a problem that the absolute value of the negative dielectric constant anisotropy is not large.

The liquid crystal compound having a 1,7,8-trifluoronaphthalene-2,6-diyl group has already been known (see Patent Document 8) and has already been applied to the nematic liquid crystal composition having a negative dielectric constant anisotropy (see Patent Documents 9 and 10). In the above publications, however, there was not such a specific description about the kind of the compound used to prepare a composition in order to achieve the above object in a liquid crystal composition using a compound having a 1,7,8-trifluoronaphthalene-2,6-diyl group. Said compound itself is characterized by a large absolute value of the negative dielectric constant anisotropy and a high nematic phase-isotropic liquid phase transition temperature ($T_{N-I}$), but had such a problem that a liquid crystal display device using said compound shows a low response speed because of comparatively high viscosity.

As described above, it is not easy to provide a liquid crystal composition which has a large absolute value of the negative dielectric constant anisotropy, a high nematic phase-isotropic liquid phase transition temperature ($T_{N-I}$) and a low viscosity. Thus, it was required to develop a liquid crystal composition having excellent characteristics.

(Patent Document 1)
Japanese Patent Application, First Publication No. Hei 11-242225 (page 1)
(Patent Document 2)
Japanese Patent Application, First Publication No. Hei 8-104869 (page 2)
(Patent Document 3)
Japanese Patent Application, First Publication No. Hei 10-176167 (page 2)
(Patent Document 4)
Japanese Patent Application, First Publication No. Hei 11-140447 (page 2)
(Patent Document 5)
Japanese Patent Application, First Publication No. 2001-192657 (page 2)
(Patent Document 6)
Japanese Patent Application, First Publication No. 2001-316669 (page 2)
(Patent Document 7)
Japanese Patent Application, First Publication No. 2002-201474 (page 2)
(Patent Document 8)
German Patent
German Patent Application No. 19522195A (page 2)
(Patent Document 9)
Japanese Patent Application, First Publication No. 2001-40354 (page 2)
(Patent Document 10)
Japanese Patent Application, First Publication No. 2002-69449 (page 2)
(Non-Patent Document 1)
Ohmuro et al., Society for Information Display (SID) Digest, Society for Information Display (SID), 1997, p 845-848
(Non-Patent Document 2)
Ohta et al., Asia Display Digest, Society for Information Display (SID), 1995, p 707-710

DISCLOSURE OF THE INVENTION

An object of the present invention is to provide a nematic liquid crystal composition having a negative dielectric constant anisotropy, capable of driving at a low voltage, which has a large absolute value of a negative dielectric constant anisotropy, a wide range of a liquid crystal temperature and a low viscosity, and to provide a liquid crystal display device using the composition.

To achieve the above object, the present invention provides a nematic liquid crystal composition having a dielectric constant anisotropy of −12 to −3, a nematic phase-isotropic liquid phase transition temperature ($T_{N\text{-}I}$) of 80 to 120° C., and a viscosity of 45 mPa·s or less, comprising at least one compound selected from the group of compounds represented by the general formulas (IA) and (IB), the total content being from 10 to 70% by mass, at least one compound selected from the group of compounds represented by the general formulas (IIA), (IIB), (IIC) and (IID), the total content being from 10 to 70% by mass, the total content of at least one compound selected from the group of compounds represented by the general formulas (IA), (IB), (IIA), (IIB), (IIC) and (IID) being from 35 to 80% by mass, and a compound represented by the general formula (III) in the content of 20 to 65% by mass:

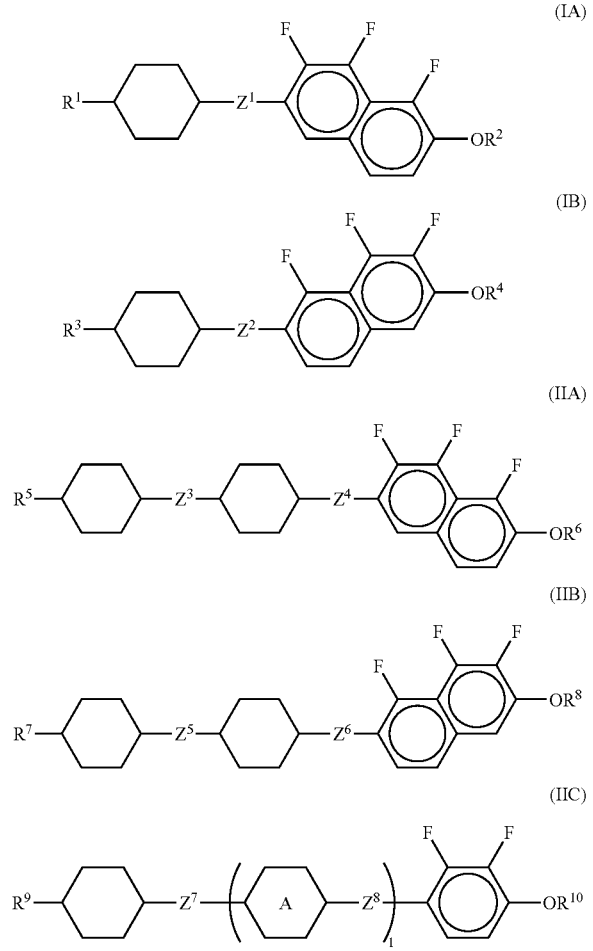

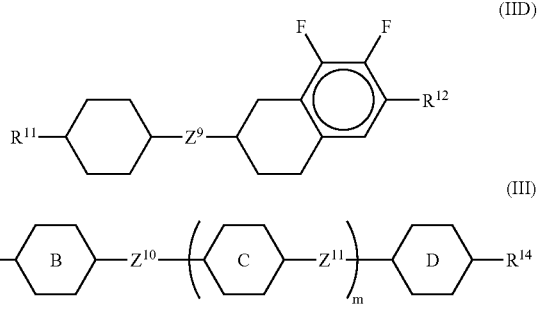

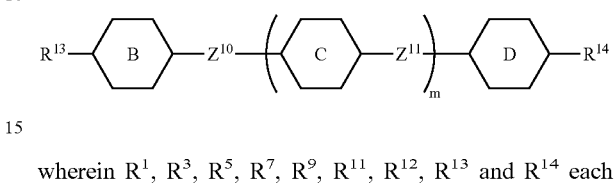

wherein $R^1$, $R^3$, $R^5$, $R^7$, $R^9$, $R^{11}$, $R^{12}$, $R^{13}$ and $R^{14}$ each independently represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one, or two or more $CH_2$ groups, which are present in said alkyl group, said alkoxy group, said alkenyl group or said alkenyloxy group, may be substituted with —O—, —CO—, or —COO—, while O atoms do not bond with each other directly;

$R^2$, $R^4$, $R^6$, $R^8$ and $R^{10}$ each independently represents an alkyl group having 1 to 10 carbon atoms, or an alkenyl group having 2 to 10 carbon atoms, and one, or two or more $CH_2$ groups, which are present in said alkyl group, said alkoxy group, said alkenyl group or said alkenyloxy group, may be substituted with —O—, —CO— or —COO—, while O atoms do not bond with each other directly; and $Z^1$ to $Z^6$ and $Z^9$ to $Z^{11}$ each independently represents a single bond, —CH$_2$CH$_2$—, —CH═CH—, —CH$_2$CH$_2$CH$_2$CH$_2$—, —CH$_2$CH$_2$CH$_2$O—, —OCH$_2$CH$_2$CH$_2$—, —CH═CHCH$_2$CH$_2$—, —CH$_2$CH$_2$CH═CH—, —C≡C—, —CH$_2$O—, —OCH$_2$—, —CF$_2$O—, —COO—, or —OCO—;

$Z^7$ and $Z^8$ each independently represents a single bond, —CH$_2$CH$_2$—, —CH═CH—, —CH$_2$CH$_2$CH$_2$CH$_2$—, —CH$_2$CH$_2$CH$_2$O—, —OCH$_2$CH$_2$CH$_2$—, —CH═CHCH$_2$CH$_2$—, —CH$_2$CH$_2$CH═CH—, —C≡C—, —CH$_2$O—, or —OCH$_2$—;

l and m represent 0 or 1;

A represents a trans-1,4-cyclohexylene group or a 1,4-phenylene group; and

B, C and D each independently represents a trans-1,4-cyclohexylene group, a 1,4-phenylene group, or a trans-1,4-cyclohexenylene group, and provides a liquid crystal display device using said liquid crystal composition.

Since the liquid crystal composition of the present invention has a negative dielectric constant anisotropy having an absolute value, a wide range of a liquid crystal temperature and a low viscosity, a display device using said liquid crystal composition shows a high response speed and is capable of driving at a low voltage and is therefore useful as a liquid crystal display device which requires a liquid crystal composition having a negative dielectric constant anisotropy.

BEST MODE FOR CARRYING OUT THE INVENTION

Figure 1:
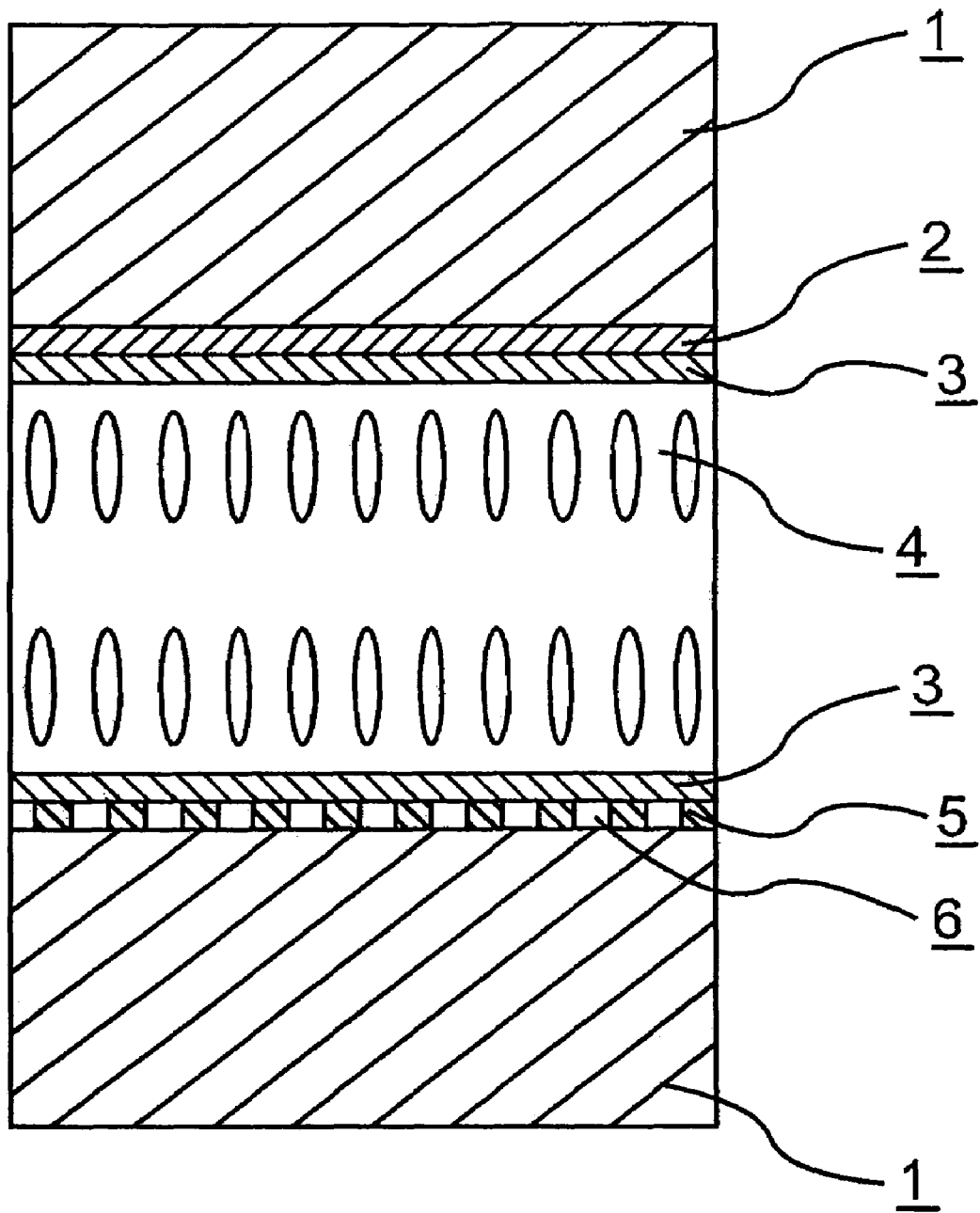
FIG. 1 is a schematic view for explaining a cross section of a liquid crystal display device which shows VA mode display characteristics.

The nematic liquid crystal composition obtained in the present invention has properties characterized by a negative dielectric constant anisotropy having a large absolute value, a wide range of a liquid crystal temperature and a low viscosity. It also has properties characterized by an excellent voltage holding ratio and excellent chemical and physical stability to a desired driving voltage. Furthermore, it is capable of driving at a low voltage because of excellent steepness.

In the compounds represented by the general formulas (IA) and (IB), $R^1$ to $R^4$ each independently preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group.

$R^1$ to $R^4$ preferably represent an alkyl group having 1 to 5 carbon atoms or an alkenyl group having 2 to 5 carbon atoms.

Preferably, $Z^1$ to $Z^2$ each independently represents a single bond, —CH$_2$CH$_2$—, —CH=CH— or —C≡C—, and more preferably a single bond or —CH$_2$CH$_2$—.

Specifically, the compounds represented by the general formulas (IA) and (IB) are preferably compounds represented by the general formulas (IA-1) to (IA-4) and (IB-1) to (IB-4):

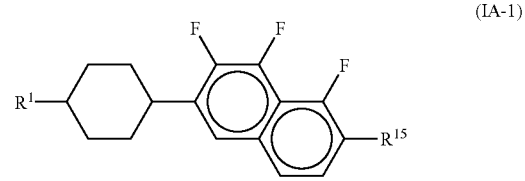
(IA-1)

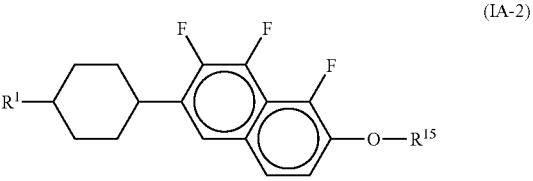
(IA-2)

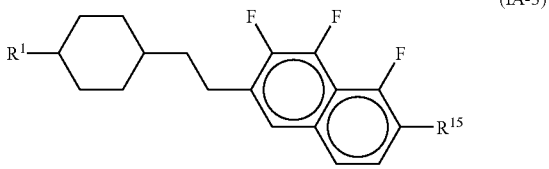
(IA-3)

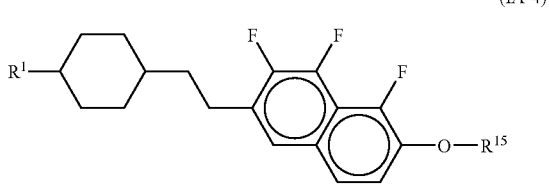
(IA-4)

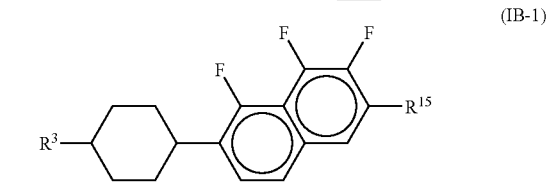
(IB-1)

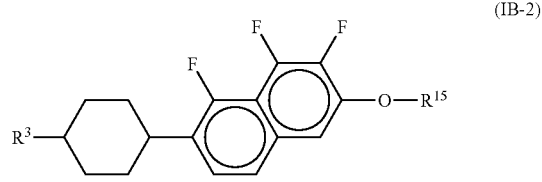
(IB-2)

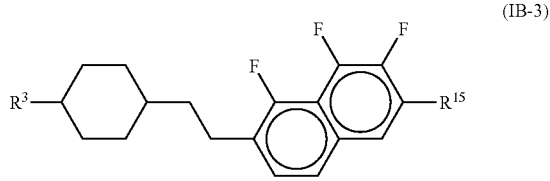
(IB-3)

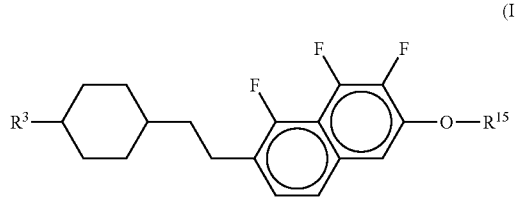
(IB-4)

wherein $R^1$ and $R^3$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more CH$_2$ groups, which are present in said alkyl group, said alkoxy group, said alkenyl group or said alkenyloxy group, may be substituted with —O—, —CO—, or —COO—, while O atoms do not bond with each other directly, each substituent preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group, and $R^{15}$ represents an alkyl group having 1 to 10 carbon atoms or an alkenyl group having 2 to 10 carbon atoms.

The compounds represented by the general formulas (IA-1) to (IA-4) and (IB-1) to (IB-4) have a negative dielectric constant anisotropy having a large absolute value and a high nematic phase-isotropic liquid phase transition temperature ($T_{N-I}$). When driving at a low voltage is particularly required, the compound represented by the general formulas (IA-2), (IA-4), (IB-2) or (IB-4), which has a negative dielectric constant anisotropy having a very large absolute value, is preferable.

In the compounds represented by the general formulas (IA-1) to (IA-4) and (IB-1) to (IB-4), $R^1$ and $R^3$ preferably represent an alkyl group having 1 to 5 carbon atoms or an alkenyl group having 2 to 5 carbon atoms, and the alkenyl group is particularly preferably a vinyl group, a 1-propenyl group, or a 3-butenyl group.

$R^{15}$ preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group.

In the compounds represented by the general formulas (IIA) and (IIB), preferably, $R^5$ to $R^8$ each independently represents an alkyl group having 1 to 5 carbon atoms or an alkenyl group having 2 to 5 carbon atoms, and the alkenyl group is particularly preferably a vinyl group, a 1-propenyl group, or a 3-butenyl group.

Preferably, $Z^3$ to $Z^6$ each independently represents a single bond, —CH$_2$CH$_2$—, —CH=CH—, or —C≡C—, and more preferably a single bond or —CH$_2$CH$_2$—.

Specifically, the compounds represented by the general formulas (IIA) and (IIB) are preferably compounds represented by the following general formulas (IIA-1) to (IIA-6) and (IIB-1) to (IIB-6):

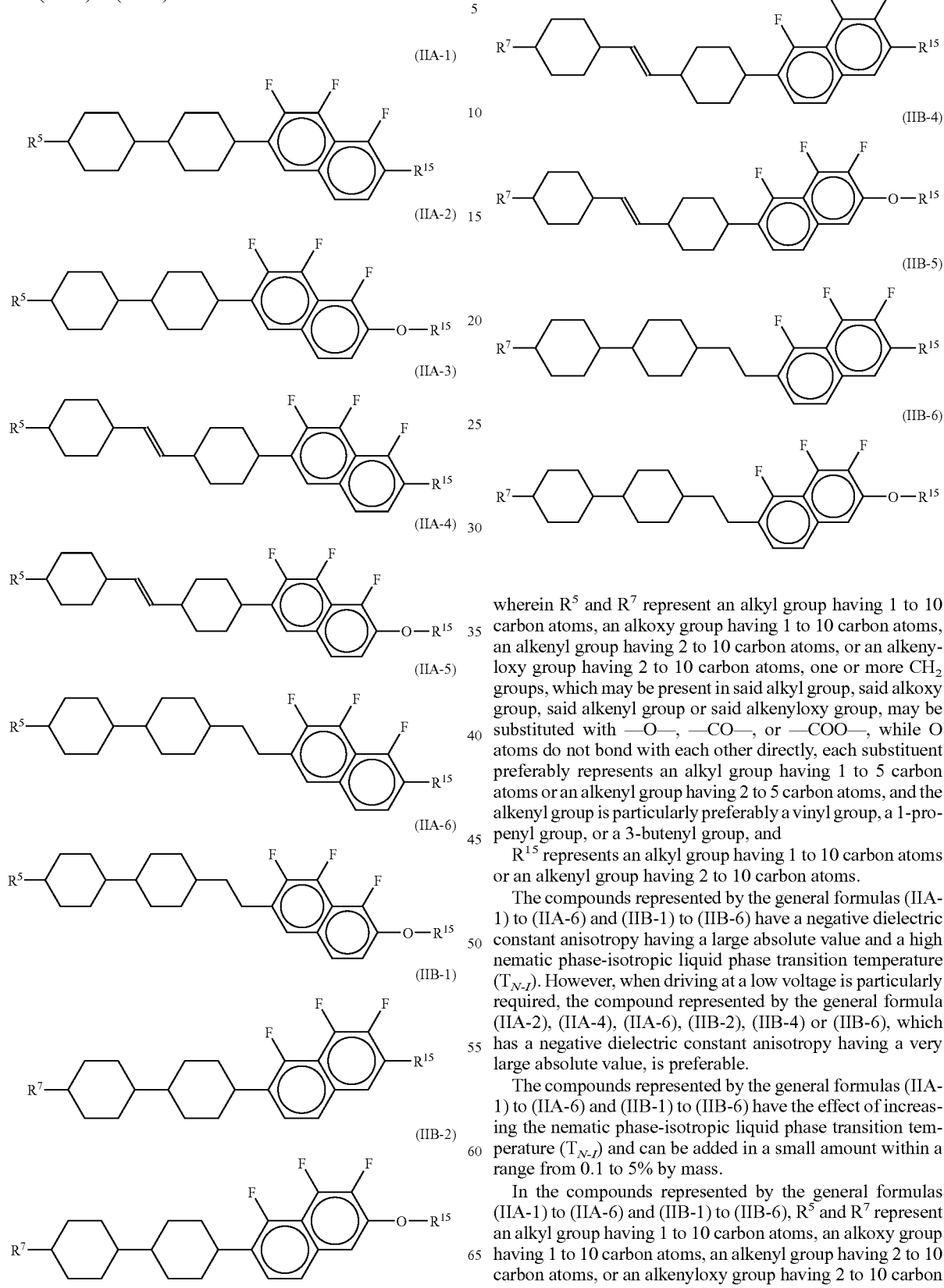

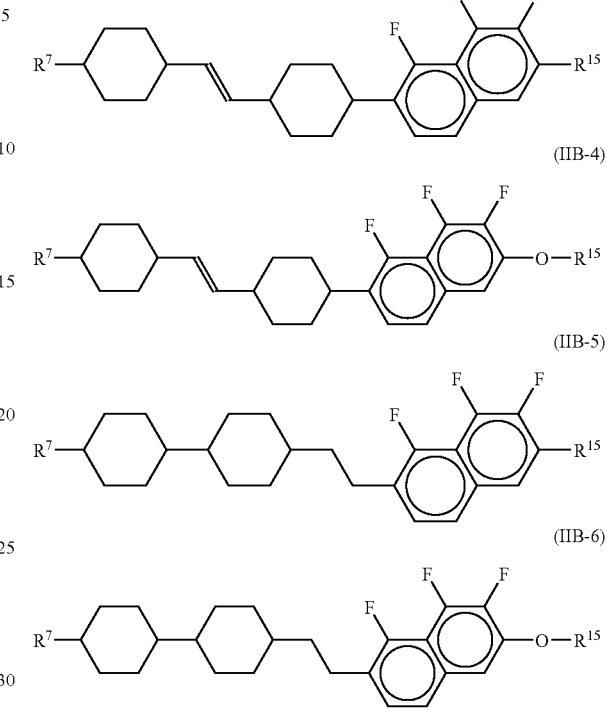

wherein $R^5$ and $R^7$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which may be present in said alkyl group, said alkoxy group, said alkenyl group or said alkenyloxy group, may be substituted with —O—, —CO—, or —COO—, while O atoms do not bond with each other directly, each substituent preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group, and $R^{15}$ represents an alkyl group having 1 to 10 carbon atoms or an alkenyl group having 2 to 10 carbon atoms.

The compounds represented by the general formulas (IIA-1) to (IIA-6) and (IIB-1) to (IIB-6) have a negative dielectric constant anisotropy having a large absolute value and a high nematic phase-isotropic liquid phase transition temperature ($T_{N-I}$). However, when driving at a low voltage is particularly required, the compound represented by the general formula (IIA-2), (IIA-4), (IIA-6), (IIB-2), (IIB-4) or (IIB-6), which has a negative dielectric constant anisotropy having a very large absolute value, is preferable.

The compounds represented by the general formulas (IIA-1) to (IIA-6) and (IIB-1) to (IIB-6) have the effect of increasing the nematic phase-isotropic liquid phase transition temperature ($T_{N-I}$) and can be added in a small amount within a range from 0.1 to 5% by mass.

In the compounds represented by the general formulas (IIA-1) to (IIA-6) and (IIB-1) to (IIB-6), $R^5$ and $R^7$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO—, or —COO—, while O atoms do not bond with each other directly, each substituent preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group. $R^{15}$ preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group.

In the compound represented by the general formula (IIC), $R^9$ to $R^{10}$ each independently represents an alkyl group having 1 to 5 carbon atoms or an alkenyl group having 2 to 5 carbon atoms, and the alkenyl group is particularly preferably a vinyl group, a 1-propenyl group, or a 3-butenyl group.

Preferably $Z^7$ to $Z^8$ each independently represents a single bond, —CH$_2$CH$_2$—, —CH=CH—, or —C≡C—, and more preferably a single bond or —CH$_2$CH$_2$—.

Specifically, the compound represented by the general formula (IIC) preferably comprises compounds represented by the following general formulas (IIC-1) to (IIC-10).

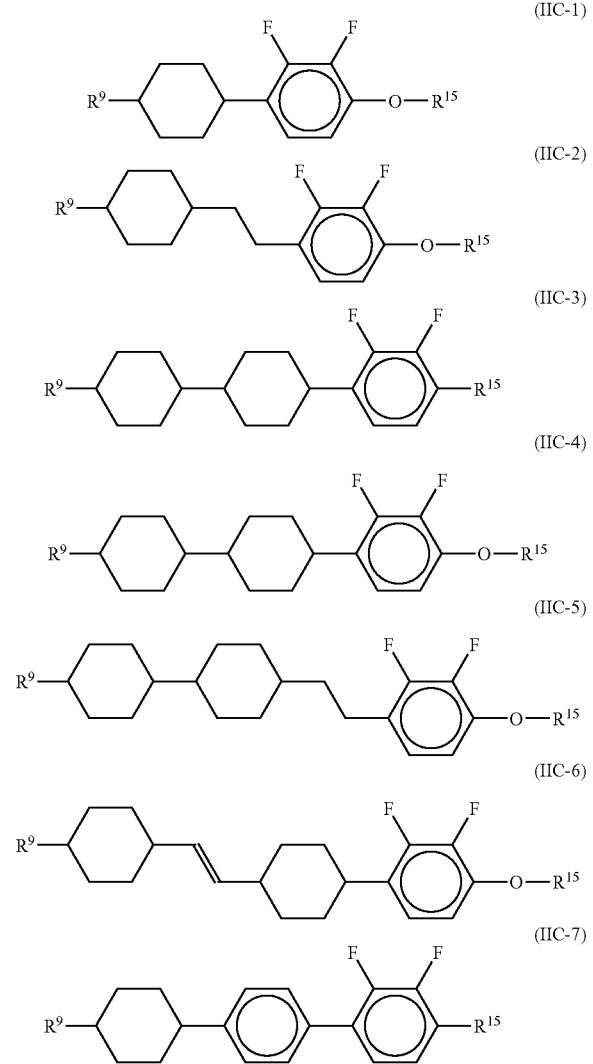

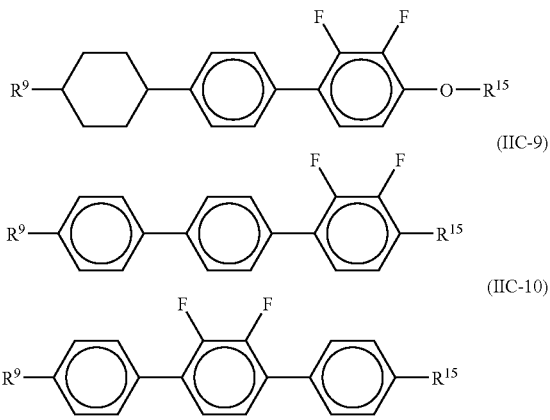

wherein $R^9$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more CH$_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

Among the compounds represented by the general formulas (IIC-1) to (IIC-10), the compound represented by the general formula (IIC-1), (IIC-2), (IIC-4), (IIC-5), (IIC-6) or (IIC-8) is preferable because of a low driving voltage and a high response speed.

In the compounds represented by the general formulas (IIC-1) to (IIC-10), $R^9$ preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group. $R^{15}$ preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group.

In the compound represented by the general formula (IID), $R^{11}$ to $R^{12}$ each independently represents an alkyl group having 1 to 5 carbon atoms or an alkenyl group having 2 to 5 carbon atoms, preferably, and the alkenyl group is particularly preferably a vinyl group, a 1-propenyl group, or a 3-butenyl group.

$Z^9$ preferably represents a single bond, —CH$_2$CH$_2$—, —CH=CH—, or —C≡C—, and more preferably a single bond or —CH$_2$CH$_2$—.

Specifically, the compound represented by the general formula (IID) preferably comprises compounds represented by the following general formulas (IID-1) to (IID-3):

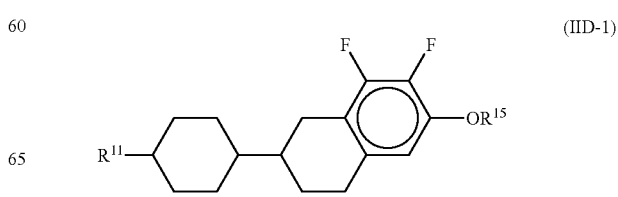

-continued

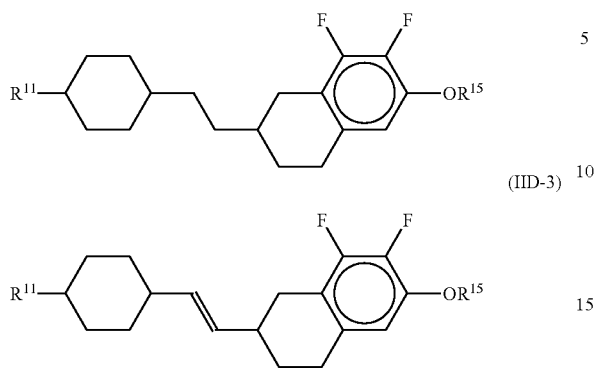

(IID-2)

(IID-3)

wherein $R^{11}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, the substituent preferably represents an alkyl group having 1 to 5 carbon atoms or an alkenyl group having 2 to 5 carbon atoms, and the alkenyl group is particularly preferably a vinyl group, a 1-propenyl group, or a 3-butenyl group. $R^{15}$ represents an alkyl group having 1 to 10 carbon atoms or an alkenyl group having 2 to 10 carbon atoms.

The amount of the compounds represented by the general formulas (IID-1) to (IID-3) to be added is preferably a small amount in view of properties, more preferably from 0.1 to 15% by mass, and particularly preferably from 0.1 to 10% by mass.

In the compound represented by the general formula (III), preferably, $R^{13}$ to $R^{14}$ each independently represents an alkyl group having 1 to 5 carbon atoms or an alkenyl group having 2 to 5 carbon atoms, and the alkenyl group is particularly preferably a vinyl group, a 1-propenyl group, or a 3-butenyl group.

Preferably, $Z^{10}$ to $Z^{11}$ each independently represents a single bond, —$CH_2CH_2$—, —CH=CH—, or —C≡C—, and more preferably a single bond or —$CH_2CH_2$—.

Specifically, the compound represented by the general formula (IIC) preferably comprises compounds represented by the general formulas (III-1) to (III-22):

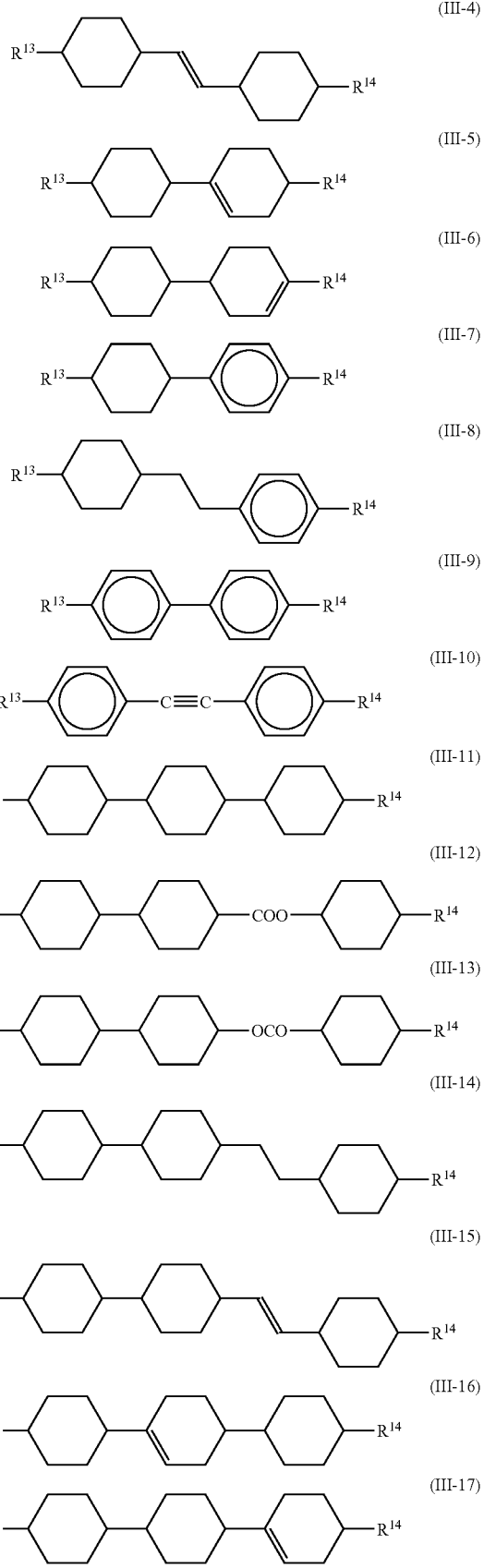

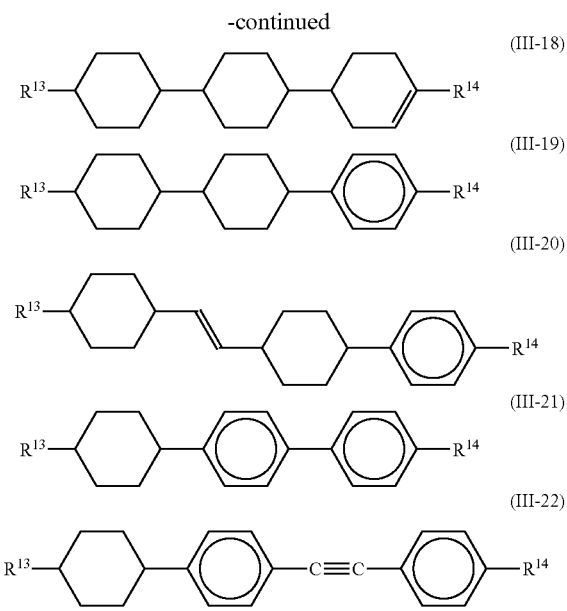

wherein $R^{13}$ and $R^{14}$ each independently represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, each substituent independently represents an alkyl group having 1 to 5 carbon atoms or an alkenyl group having 2 to 5 carbon atoms, preferably, and the alkenyl group is particularly preferably a vinyl group, a 1-propenyl group, or a 3-butenyl group.

The compounds represented by the general formulas (III-1) to (III-22) have particularly low viscosity and are effective to improve high-speed response. Among these compounds, the compound represented by the general formula (III-1), (III-2), (III-3), (III-4), (III-7), (III-11), (III-12), (III-13), (III-14), (III-15), (III-19), (III-20) or (III-21) is preferable and the compound represented by the general formula (III-1), (III-2), (III-4), (III-7), (III-11), (III-12), (III-13), (III-15), (III-19), (III-20) or (III-21) is more preferable.

(1) In Case of Setting Importance on Response Speed

The total content of the compounds selected from the group of compounds represented by the general formulas (IA) and (IB) is preferably from 10 to 40% by mass, and more preferably from 15 to 40% by mass. The content of the compound represented by the general formula (IIC) is preferably from 10 to 40% by mass, and more preferably from 15 to 40% by mass. The total content of the compounds selected from the group of compounds represented by the general formulas (IA), (IB) and (IIC) is preferably from 45 to 70% by mass, and more preferably from 50 to 70% by mass.

More specifically, the total content of the compounds selected from the group of compounds represented by the general formulas (IA) and (IB) is preferably from 10 to 40% by mass, the content of the compound represented by the general formula (IIC) is preferably from 10 to 40% by mass, the total content of the compounds selected from the group of compounds represented by the general formulas (IA), (IB) and (IIC) is preferably from 45 to 70% by mass, and the content of the compound represented by the general formula (III) is preferably from 30 to 55% by mass. The total content of the compounds selected from the group of compounds represented by the general formulas (IA) and (IB) is more preferably from 15 to 40% by mass, the content of the compound represented by the general formula (IIC) is more preferably from 15 to 40% by mass, the total content of the compounds selected from the group of compounds represented by the general formulas (IA), (IB) and (IIC) is more preferably from 50 to 70% by mass, and the content of the compound represented by the general formula (III) is more preferably from 30 to 55% by mass. In this case, the dielectric constant anisotropy is preferably within a range from $-6$ to $-3$, the nematic phase-isotropic liquid phase transition temperature ($T_{N-I}$) is preferably within a range from 80 to 120° C., the refractive index anisotropy is preferably within a range from 0.07 to 0.15, and the viscosity is preferably 30 mPa·s or less.

The dielectric constant anisotropy is more preferably within a range from $-6$ to $-4$, the nematic phase-isotropic liquid phase transition temperature ($T_{N-I}$) is more preferably within a range from 90 to 120° C., and the refractive index anisotropy is more preferably within a range from 0.07 to 0.12, and particularly preferably from 0.07 to 0.11.

In case of setting importance on the response speed, the total content of the compounds selected from the group of compounds represented by the general formulas (IA), (IB) and (IIC) is preferably from 45 to 55% by mass. In this case, the viscosity is preferably 26 mPa·s or less.

Furthermore, the liquid crystal composition of the present invention has excellent steepness and can operate at a lower driving voltage than that of a conventional liquid crystal composition having the same dielectric constant anisotropy. This is because the compound selected from compounds of the general formulas (IA) to (IIB) is used as a first component which has a very large absolute value of a negative dielectric constant anisotropy and also the compound of the general formula (III) is effectively used in combination as a second component.

(2) In Case of Setting Importance on Wide Nematic Phase-Isotropic Liquid Phase Transition Temperature ($T_{N-I}$) Range The total content of the compounds selected from the group of compounds represented by the general formulas (IA) and (IB) is preferably from 25 to 60% by mass, and more preferably from 30 to 60% by mass, the total content of the compounds selected from the group of compounds represented by the general formulas (IIA) and (IIB) is preferably 25% by mass or less, and the total content of the compounds selected from the group of compounds represented by the general formulas (IA), (IB), (IIA) and (IIB) is preferably from 35 to 65% by mass.

More specifically, the total content of the compounds selected from the group of compounds represented by the general formulas (IA) and (IB) is preferably from 25 to 60% by mass, the total content of the compounds selected from the group of compounds represented by the general formulas (IA), (IB), (IIA) and (IIB) is preferably from 35 to 65% by mass, and the content of the compound represented by the general formula (III) is preferably from 35 to 65% by mass.

In case of setting importance on driving at a low voltage, the total content of the compounds selected from the group of compounds represented by the general formulas (IA), (IB), (IIA) and (IIB) is preferably from 50 to 65% by mass. In this case, the dielectric constant anisotropy is preferably within a range from $-6$ to $-5$, the nematic phase-isotropic liquid phase transition temperature ($T_{N-I}$) is preferably within a range from 80 to 120° C., the refractive index anisotropy is preferably within a range from 0.07 to 0.15, and the viscosity is preferably 30 mPa·s or less.

In case of setting importance on a wide nematic phase-isotropic liquid phase transition temperature ($T_{N-I}$) and a response speed, the total content of the compounds selected from the group of compounds represented by the general formulas (IA), (IB), (IIA) and (IIB) is preferably from 35 to 50% by mass, and the content of the compound represented by the general formula (III) is preferably from 50 to 65% by mass. In this case, the dielectric constant anisotropy is preferably within a range from −5 to −3, the nematic phase-isotropic liquid phase transition temperature ($T_{N-I}$) is preferably within a range from 80 to 120° C., the refractive index anisotropy is preferably within a range from 0.07 to 0.15, and the viscosity is preferably 25 mPa·s or less.

(3) In Case of Particularly Setting Importance on Driving at a Low Voltage

The total content of the compounds selected from the group of compounds represented by the general formula (IA), (IB), (IIA) and (IIB) is preferably from 20 to 60% by mass, the total content of the compounds selected from the group of compounds represented by the general formulas (IIC) and (IID) is preferably from 30 to 60% by mass, and the total content of the compounds selected from the group of compounds represented by the general formulas (IA), (IB), (IIA), (IIB), (IIC) and (IID) is preferably from 70 to 80% by mass. In this case, the composition preferably contains five or more compounds represented by the general formulas (IA), (IB), (IIA), (IIB), (IIC) and (IID).

The composition may further contain 30% by mass or less of the compound represented by the general formula (III) as an additional component.

In this case, the dielectric constant anisotropy is preferably within a range from −12 to −6, the nematic phase-isotropic liquid phase transition temperature ($T_{N-I}$) is preferably within a range from 80 to 120° C., the refractive index anisotropy is preferably within a range from 0.07 to 0.15, and the viscosity is preferably 45 mPa·s or less.

Furthermore, the dielectric constant anisotropy is more preferably within a range from −12 to −9, the nematic phase-isotropic liquid phase transition temperature ($T_{N-I}$) is more preferably within a range from 90 to 120° C., and the refractive index anisotropy is more preferably within a range from 0.07 to 0.12, and particularly preferably from 0.07 to 0.11.

Particularly preferable combination, which enables driving at a low voltage, is a combination of two or more, preferably three or more compounds selected from the group of compounds represented by the general formulas (IA-2), (IA-4), (IB-2) and (IB-4) in the total content of 30 to 60% by mass, preferably 40 to 60% by mass, and the compounds selected from the group of compounds represented by the general formulas (IIA-2), (IIA-4), (IIA-6), (IIB-2), (IIB-4) and (IIB-6) in the total content of 25% by mass or less.

The liquid crystal composition of the present invention has excellent steepness can operate at a lower driving voltage than that of a conventional liquid crystal composition having the same dielectric constant anisotropy.

The liquid crystal composition of the present invention has more excellent steepness and can operate at a lower driving voltage than that of a conventional liquid crystal composition having the same dielectric constant anisotropy. This effect is exerted by selecting the compound, which has a negative dielectric constant anisotropy having a very large absolute value, as a first component and effectively using a second component in combination. The steepness ($\gamma$=Vsat/Vth) is preferably 2.2 or less, and more preferably 2.0 or less.

The liquid crystal display device of the present invention is particularly preferably used as an active matrix liquid crystal display device. To obtain a wider view angle, a display mode is preferably VA (Vertically aligned) mode, IPS (In-Plane Switching) mode or ECB (electrically controlled birefringence) mode.

Figure 2:
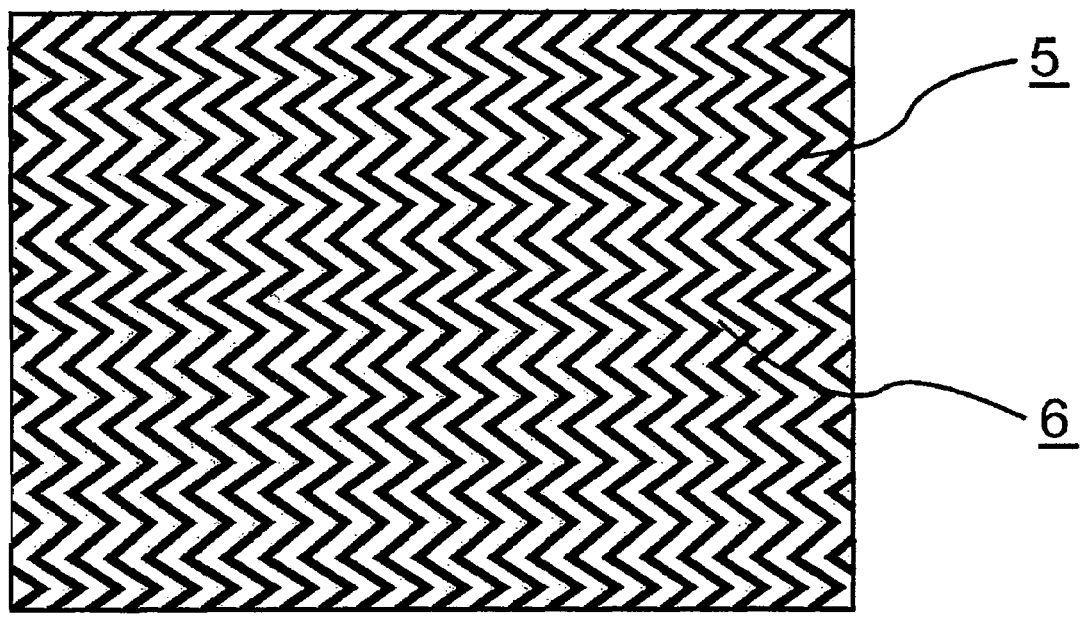
FIG. 2 is a schematic view for explaining a transparent electrode provided with a slit having a zigzag bent pattern.
Figure 3:
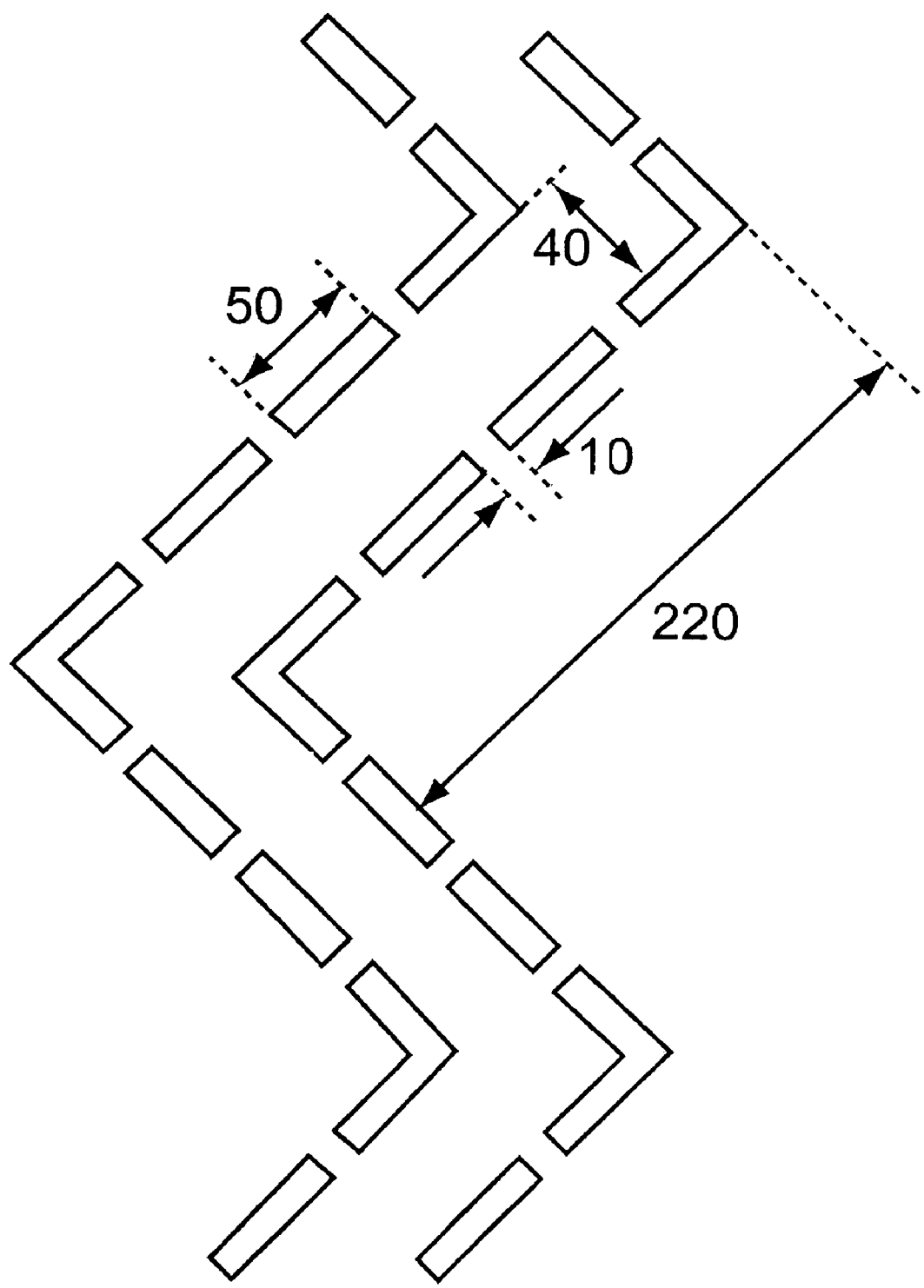
FIG. 3 is a schematic view for explaining a slit having a zigzag bent pattern (unit: μm).

The present invention will now be described in more detail by way of examples, but the present invention is not limited to these examples. In the following examples and comparative examples, percentages are by weight unless otherwise specified. A liquid crystal display device showing VA mode display characteristics was produced by the following procedure (see FIG. 1). A transparent solid electrode 2 is provided on one of opposing glass substrates 1 and a perpendicular oriented film 3 (manufactured by JSR Corporation under the trade name of JALS-204) is formed thereon. As shown in FIG. 2, the transparent electrode on opposing another glass substrate 6 is formed with a zigzag pattern 5 having a zigzag bent pattern in which slits having a width of 10 μm are provided at intervals of 50 μm, and then (see FIG. 3) a perpendicular oriented film (manufactured by JSR Corporation under the trade name of JALS-204) is formed thereon and both glass substrates are laid one upon another to obtain a VA-LCD display cell (cell thickness: 3.5 μm). A liquid crystal composition is filled in this cell to form a liquid crystal phase 4, and thus a liquid crystal display device is assembled.

In the examples, measured properties are as follows.

$T_{N-I}$: Nematic phase-isotropic liquid phase transition temperature (° C.)

Δ∈: Dielectric constant anisotropy (25° C. and 1 kHz)

Δn: Birefringent index (20° C. and 589 nm)

η: Viscosity (mPa·s) (20° C.)

Vth: Threshold voltage (V) (25° C.)

γ: Ratio of saturation voltage (Vsat) and (Vth), namely steepness (25° C.)

$\gamma = Vsat/Vth$

VHR: Voltage holding ratio (%) (70° C.)

It is represented by a ratio of a voltage Vt after holding at 5 V frame time for 20 msec to an initial voltage Vo (5 V) by %

$VHR(\%) = Vt/Vo \times 100$

A cell having a cell thickness of 6 μm subjected to homeotropic alignment (JALS-204 manufactured by JSR Corporation) was used.

EXAMPLE 1

The following liquid crystal compositions were prepared and properties were measured.

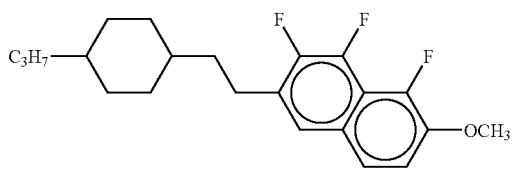

-continued
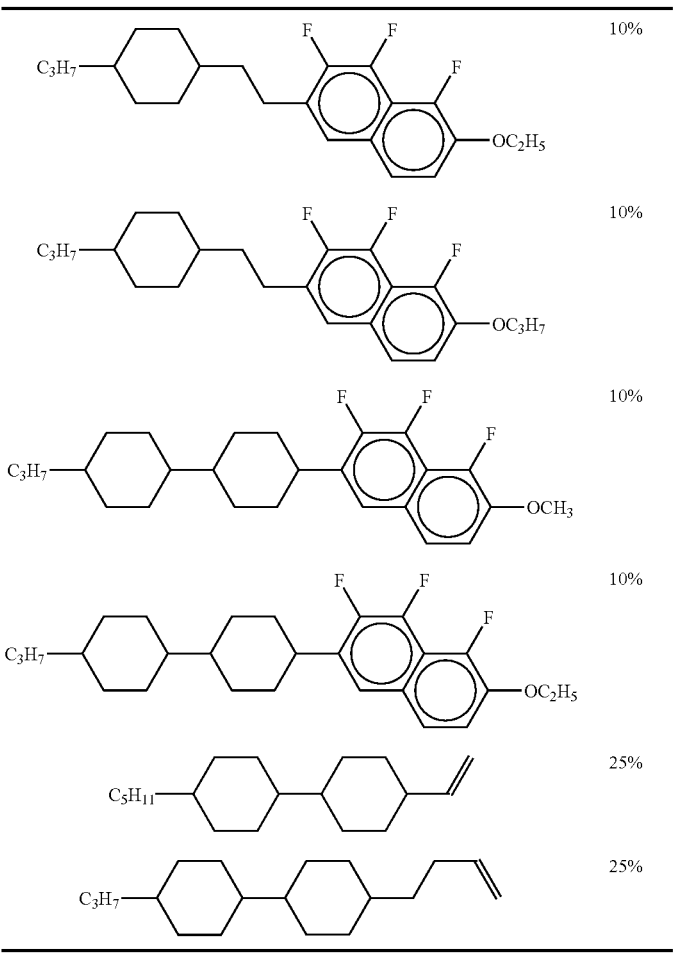
EXAMPLE 2
The following liquid crystal compositions were prepared and properties were measured.
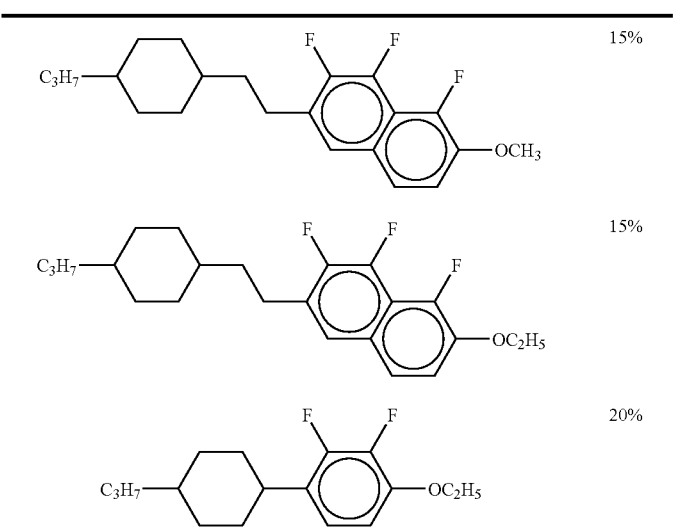

-continued
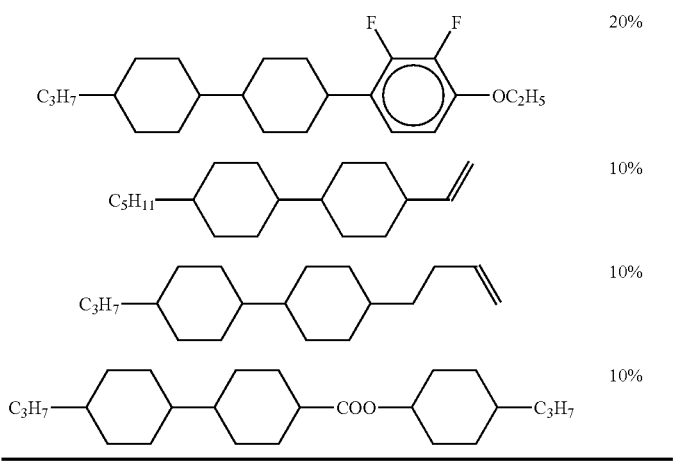
20%
10%
10%
10%
EXAMPLE 3
The following liquid crystal compositions were prepared and properties were measured.
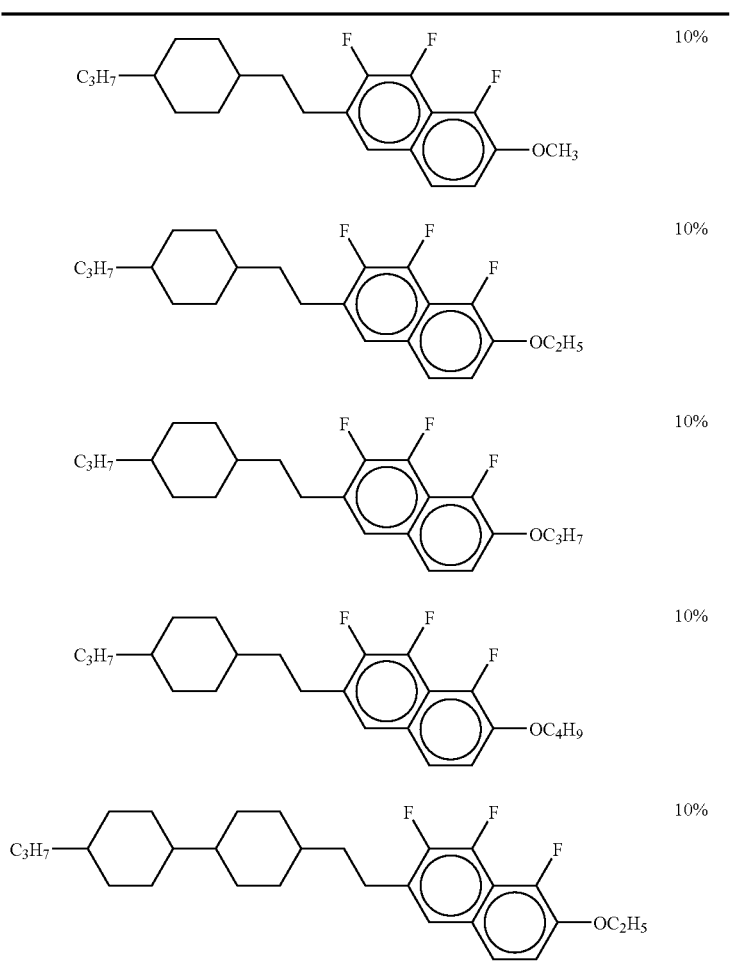
10%
10%
10%
10%
10%

-continued
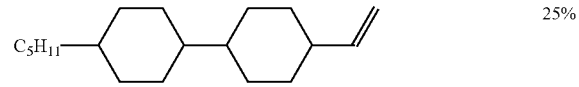 25%
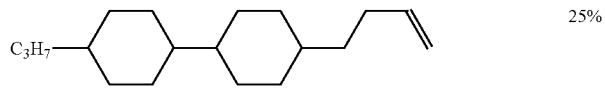 25%
COMPARATIVE EXAMPLE 1
In Comparative Example 1, the following liquid crystal compositions were prepared and properties were measured.
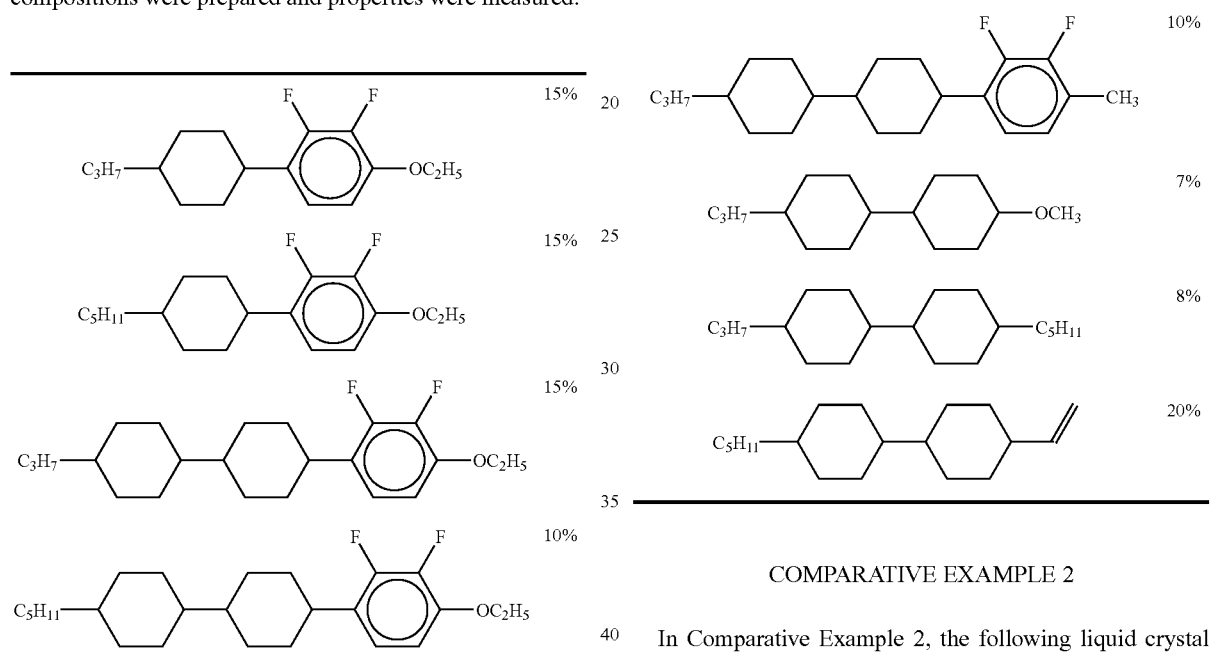
COMPARATIVE EXAMPLE 2
In Comparative Example 2, the following liquid crystal compositions were prepared and properties were measured.
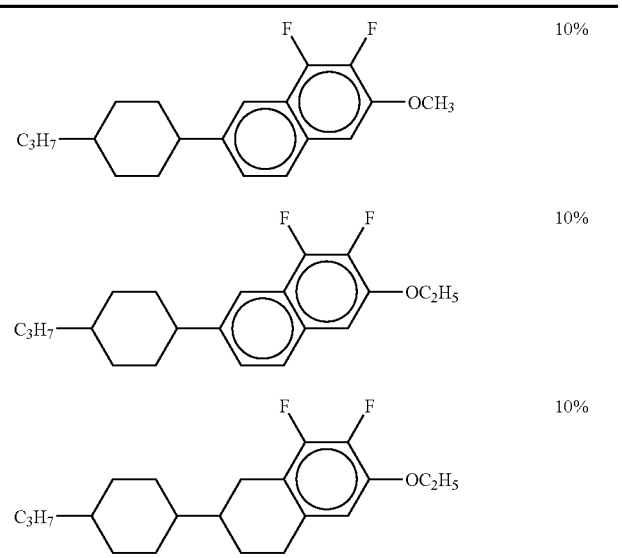

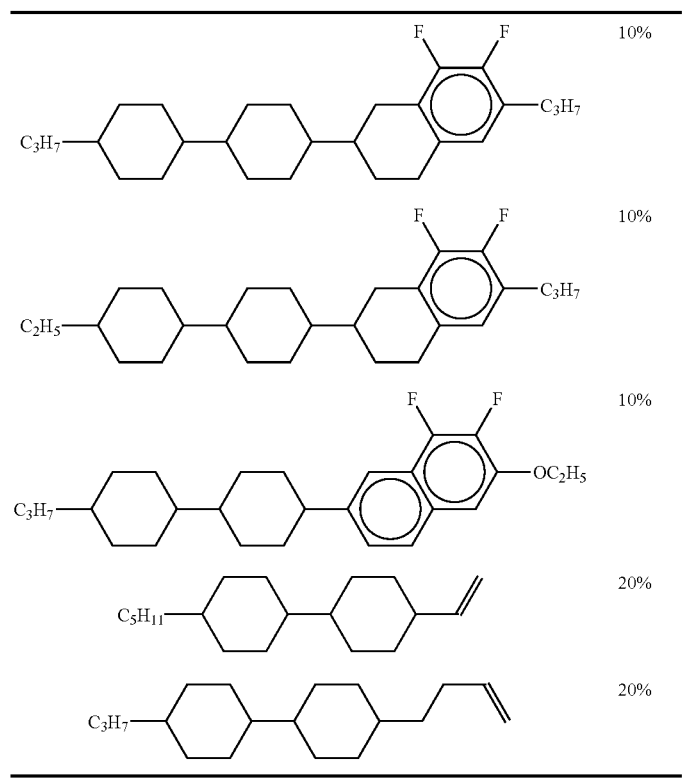

The measurement results of Examples 1, 2, 3 and Comparative Examples 1 and 2 are shown in the following table.

TABLE 1

Physical properties of Examples 1, 2, 3 and Comparative Examples 1 and 2

|  | Example 1 | Example 2 | Example 3 | Comparative Example 1 | Comparative Example 2 |
| --- | --- | --- | --- | --- | --- |
| $T_{N-I}$ (° C.) | 95.5 | 80.6 | 80.4 | 82.0 | 93.0 |
| $\Delta\epsilon$ | −4.0 | −6.8 | −4.1 | −4.0 | −2.8 |
| $\eta$ (mPa · s) | 23.8 | 25.2 | 17.2 | 23.5 | 47.5 |
| $\Delta n$ | 0.097 | 0.091 | 0.095 | 0.081 | 0.098 |
| Vth (V) | 2.14 | — | 1.92 | 2.11 | 2.34 |
| Y | 2.06 | — | 1.98 | 2.30 | 2.22 |
| VHR (%) | 99.6 | 99.5 | 99.6 | 99.5 | 99.5% |

When a comparison is made between the liquid crystal compositions of Example 1 and Comparative Example 1 in which the dielectric constant anisotropy and the viscosity are nearly the same level, it becomes apparent that the liquid crystal composition of Example 1 has considerably high nematic phase-isotropic liquid phase transition temperature ($T_{N-I}$). When a comparison is made between the liquid crystal compositions of Example 2 and Comparative Example 1 in which the nematic phase-isotropic liquid phase transition temperature ($T_{N-I}$) and viscosity are nearly the same level, it becomes apparent that the liquid crystal composition of Example 1 has considerably high absolute value of the dielectric constant anisotropy. When a comparison is made between the liquid crystal compositions of Example 3 and Comparative Example 1 in which the nematic phase-isotropic liquid phase transition temperature ($T_{N-I}$) and the dielectric constant anisotropy are nearly the same level, it becomes apparent that the liquid crystal composition of Example 3 has considerably low viscosity.

Although the liquid crystal composition of Comparative Example 1 is a composition which is considerably excellent in balance between the nematic phase-isotropic liquid phase transition temperature ($T_{N-I}$), dielectric constant anisotropy and viscosity, any composition of the present invention is excellent as compared with Comparative Example 1. In the liquid crystal composition having a high nematic phase-isotropic liquid phase transition temperature ($T_{N-I}$) of Comparative Example 2, the absolute value of the dielectric constant anisotropy is considerably small and the viscosity remarkably increases.

The liquid crystal compositions of the examples are capable of driving at a low voltage as compared with Comparative Example 1 because of excellent steepness, and is also useful as an active matrix display liquid crystal display device because of high voltage holding ratio. A display device using the liquid crystal composition of Example 6 is suited for use as VA-LCDs for such applications as liquid crystal televisions which require a high-speed response, cellular phones which require a wide range of a liquid crystal temperature, and PDAs.

EXAMPLE 4

The following liquid crystal compositions were prepared and properties were measured.

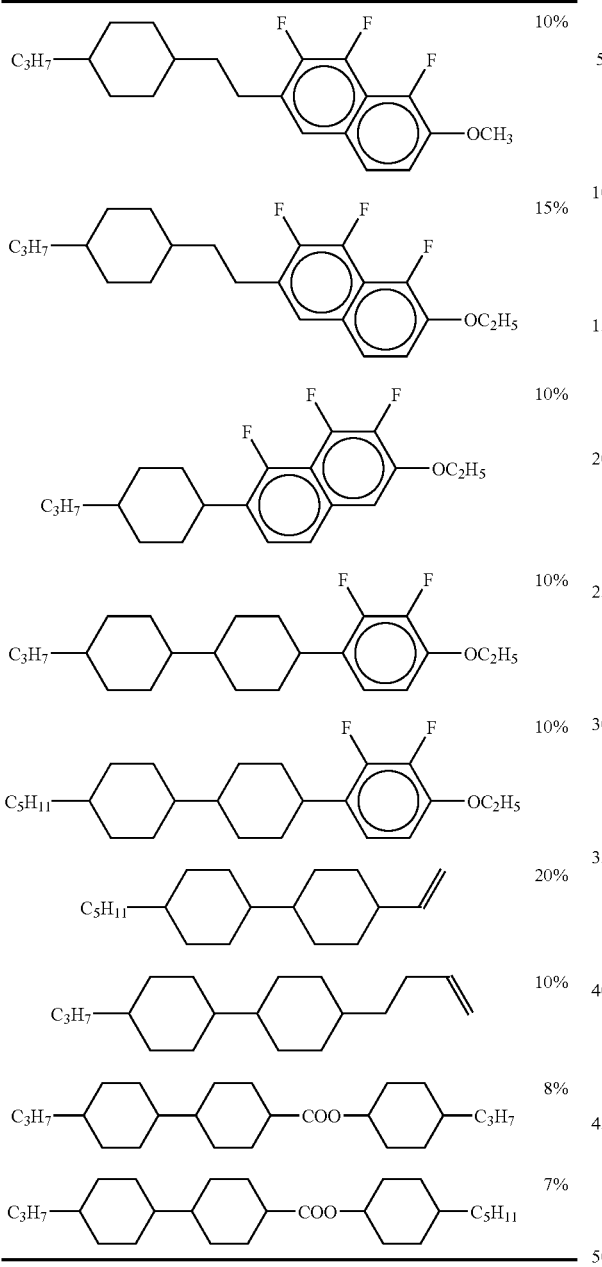

TN-I: 100.2° C.
Δε: −4.8
Δn: 0.091
η: 23.8 mPa·s
Vth: 1.81 V
Y: 1.91
VHR: 99.5%

The liquid crystal composition of Example 4 has a large absolute value of the negative dielectric constant anisotropy, a high nematic phase-isotropic liquid phase transition temperature ($T_{N\text{-}I}$) and a low viscosity.

The liquid crystal composition of Example 4 is capable of driving at a low voltage because of excellent steepness, and is useful for active matrix because of a high voltage holding ratio. A display device using the liquid crystal composition of Example 1 is suited for use as VA-LCDs for such applications as liquid crystal televisions which require a high-speed response, cellular phones which require a wide range of a liquid crystal temperature, and PDAs.

EXAMPLE 5

The following liquid crystal compositions were prepared and properties were measured.

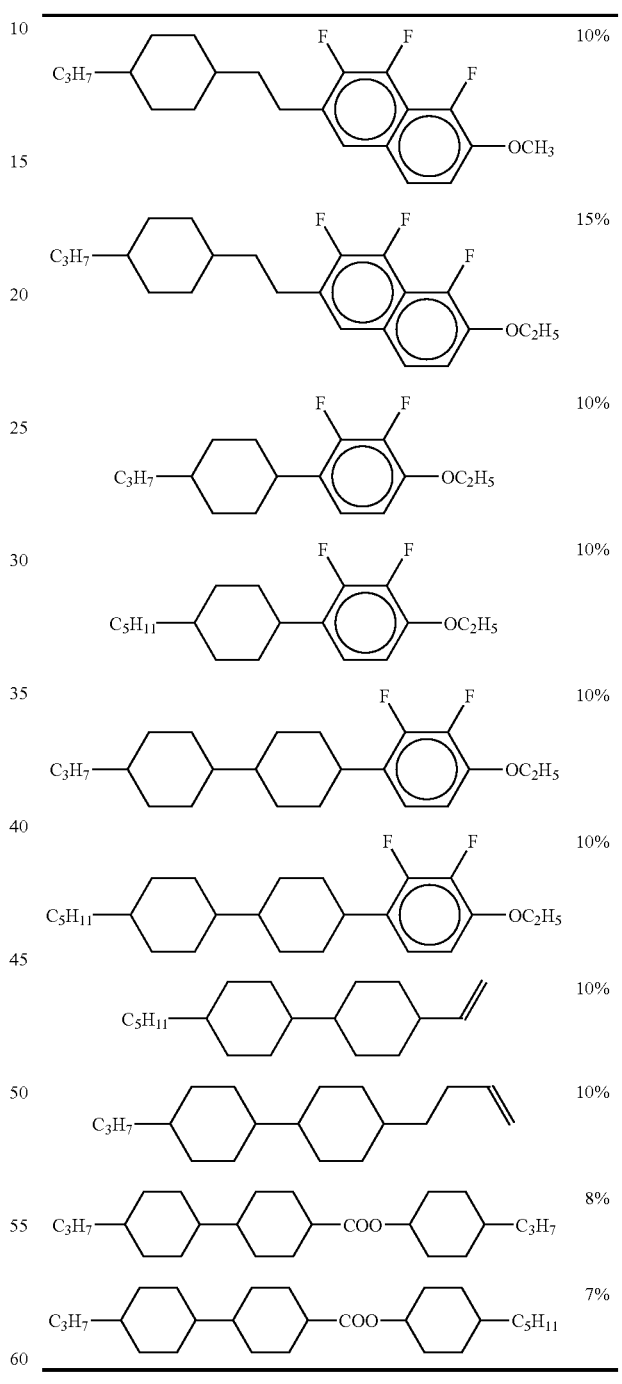

$T_{N\text{-}I}$: 84.8° C.
Δε: −5.8
Δn: 0.086
η: 24.1 mPa·s
Vth: 1.69 V
γ: 1.79
VHR: 99.4%

The liquid crystal composition of Example 5 has a large absolute value of the negative dielectric constant anisotropy and a low viscosity. It is suited for use as VA-LCDs for such applications as liquid crystal televisions which require a high-speed response, cellular phones which require driving at a low voltage, and PDAs. It is capable of driving at a low voltage because of excellent steepness.

EXAMPLE 6

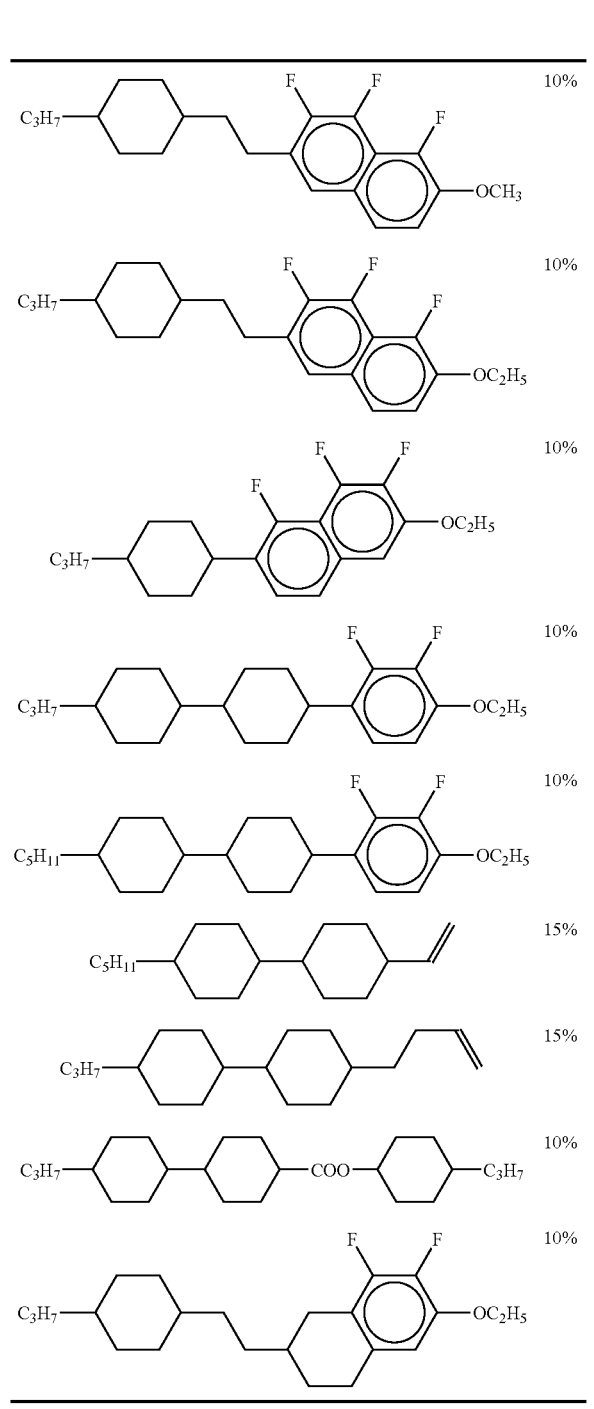

$T_{N-I}$: 91.0° C.
$\Delta\epsilon$: −4.9
$\Delta n$: 0.093
$\eta$: 25.2 mPa·s
VHR: 99.6%

The liquid crystal composition of Example 6 has a high nematic phase-isotropic liquid phase transition temperature ($T_{N-I}$) and is suited for use as VA-LCDs for such applications as cellular phones which require a wide range of a liquid crystal temperature, and PDAs.

EXAMPLE 7

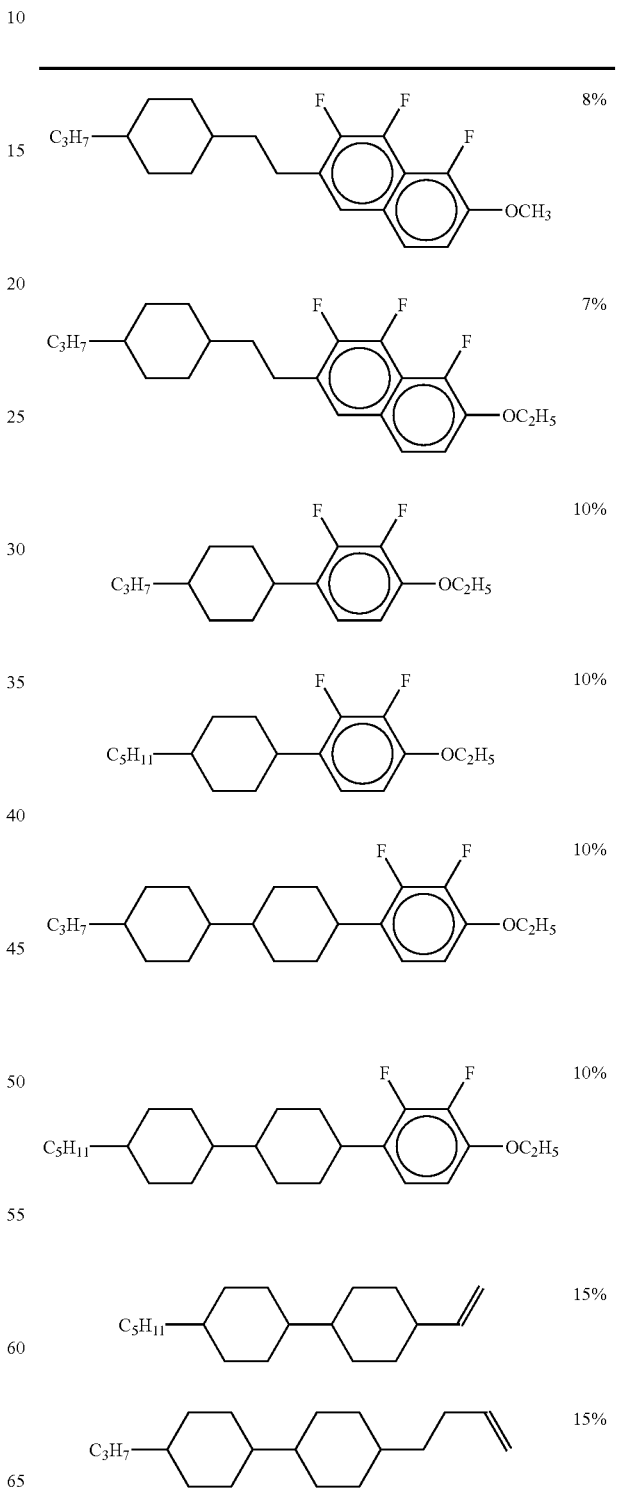

-continued

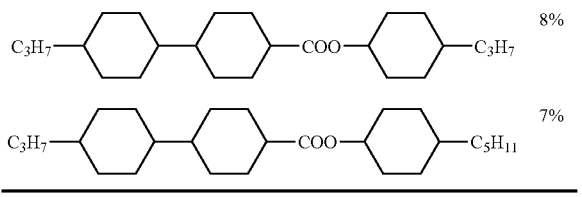

$T_{N-I}$: 83.7° C.
Δε: −4.0
Δn: 0.078
η: 20.0 mPa · s
VHR: 99.7%

The liquid crystal composition of Example 7 has a low viscosity and is suited for use as VA-LCDs for such applications as liquid crystal televisions which require a high-speed response.

EXAMPLE 8

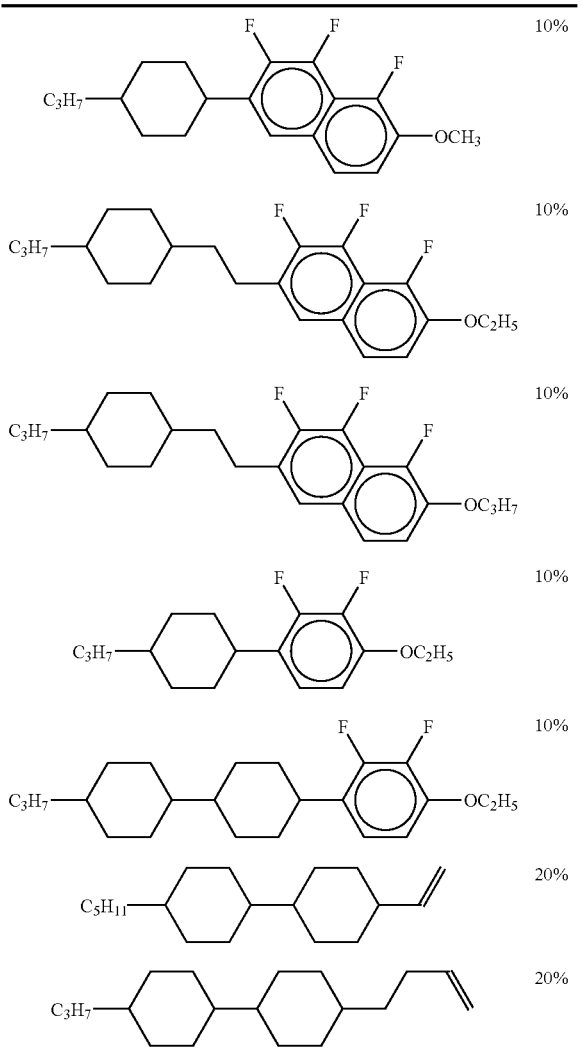

-continued

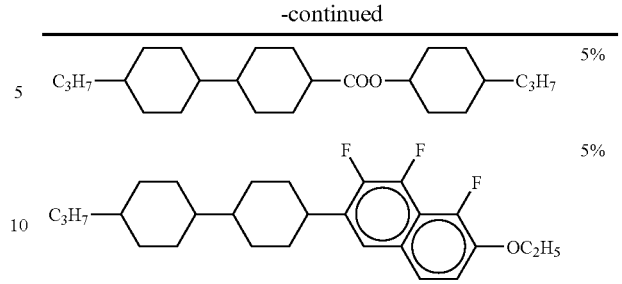

$T_{N-I}$: 82.6° C.
Δε: −4.4
Δn: 0.094
η: 21.5 mPa · s
VHR: 99.5%

The liquid crystal composition of Example 8 has a low viscosity and is suited for use as VA-LCDs for such applications as liquid crystal televisions which require a high-speed response.

EXAMPLE 9

The following liquid crystal compositions were prepared and properties were measured.

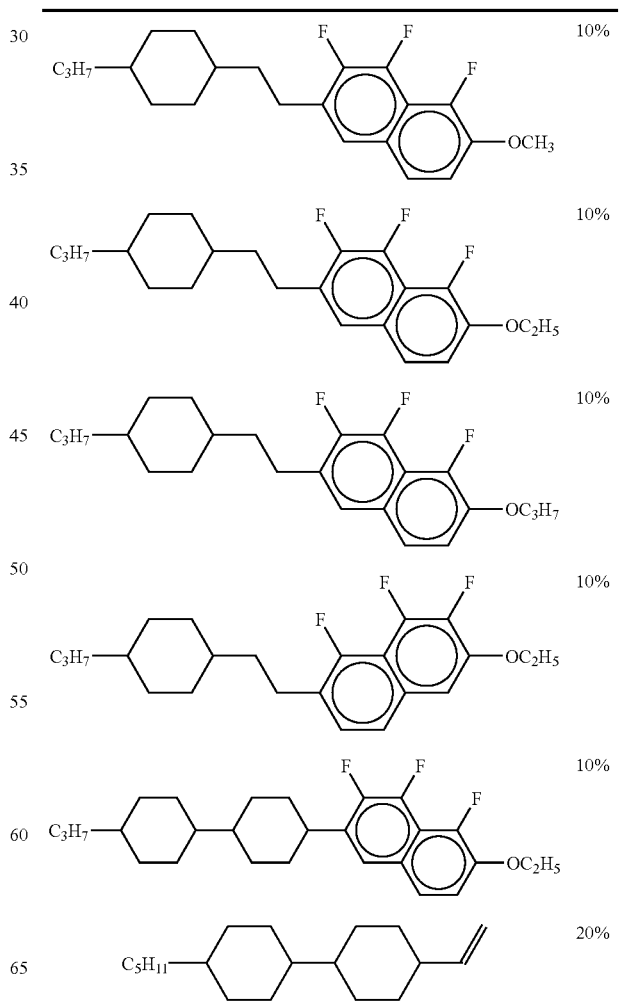

-continued

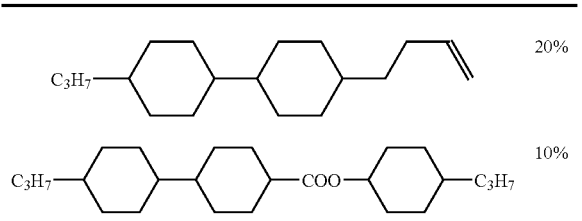 20%

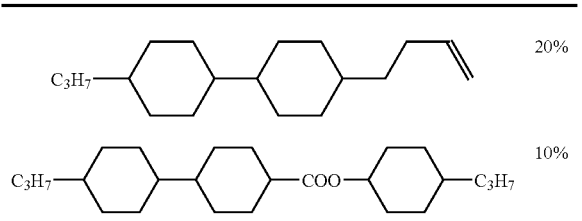 10%

$T_{N-I}$: 93.7° C.
Δε: −4.6
Δn: 0.097
η: 24.1 mPa·s
Vth: 1.92 V
γ: 1.95
VHR: 99.5%

The liquid crystal composition of Example 9 has a high nematic phase-isotropic liquid phase transition temperature ($T_{N-I}$) and a low viscosity. It is suited for use as VA-LCDs for such applications as liquid crystal televisions which require a high-speed response, cellular phones which require a wide range of a liquid crystal temperature, and PDAs.

EXAMPLE 10

The following liquid crystal compositions were prepared and properties were measured.

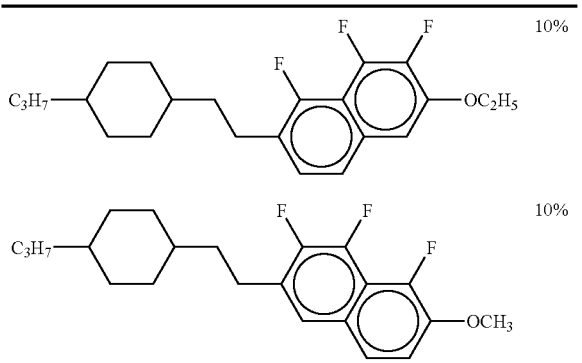 10%

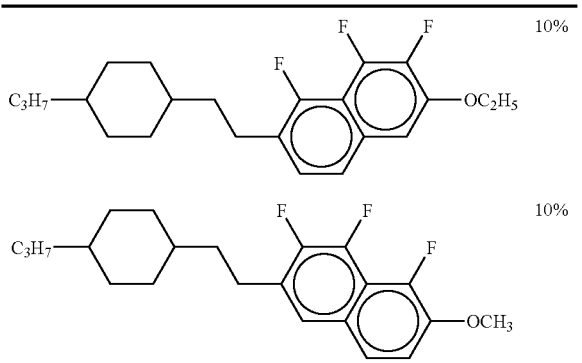 10%

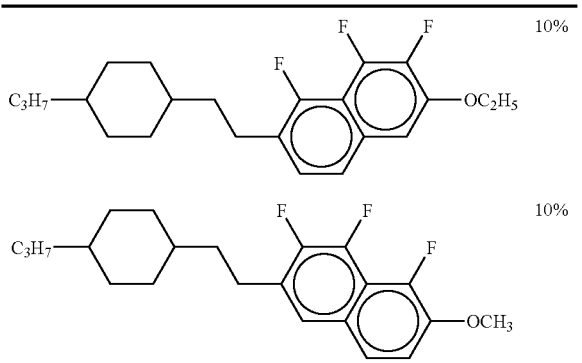 10%

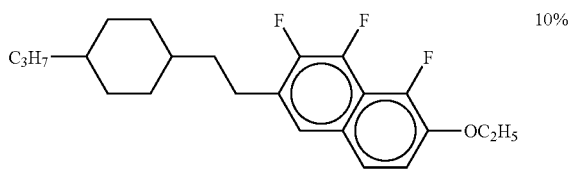 10%

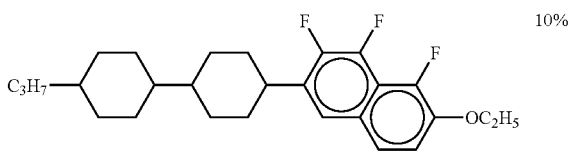 10%

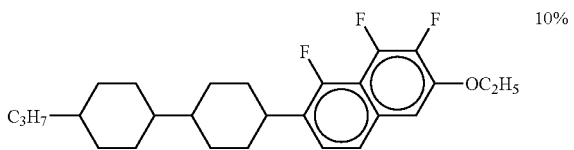 10%

-continued

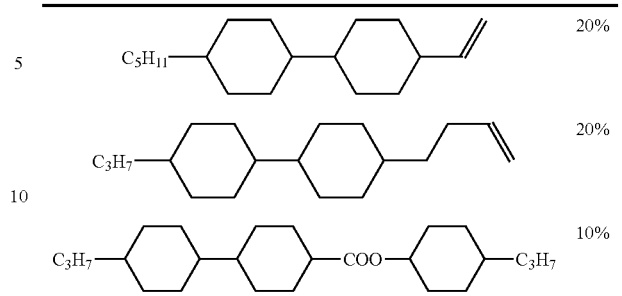 20%

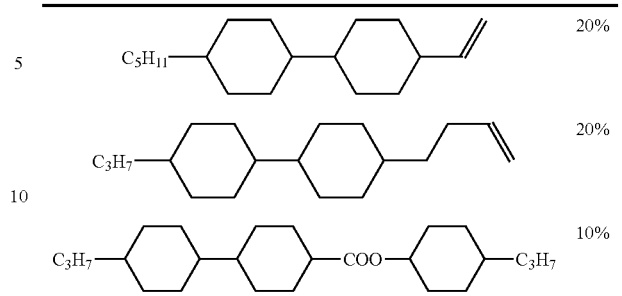 20%

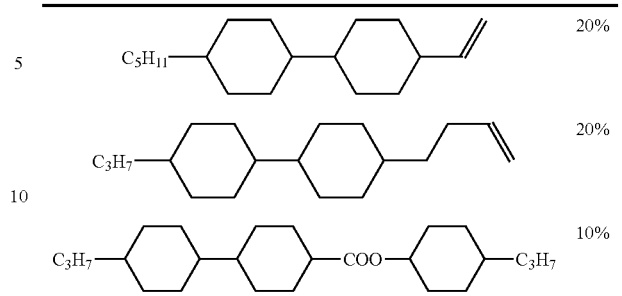 10%

$T_{N-I}$: 106.0° C.
Δε: −4.2
Δn: 0.099
η: 26.5 mPa·s
Vth: 2.02 V
γ: 2.01
VHR: 99.4%

The liquid crystal composition of Example 10 has a high nematic phase-isotropic liquid phase transition temperature ($T_{N-I}$). It is suited for use as VA-LCDs for such applications as cellular phones which require a wide range of a liquid crystal temperature, and PDAs.

EXAMPLE 11

The following liquid crystal compositions were prepared and properties were measured.

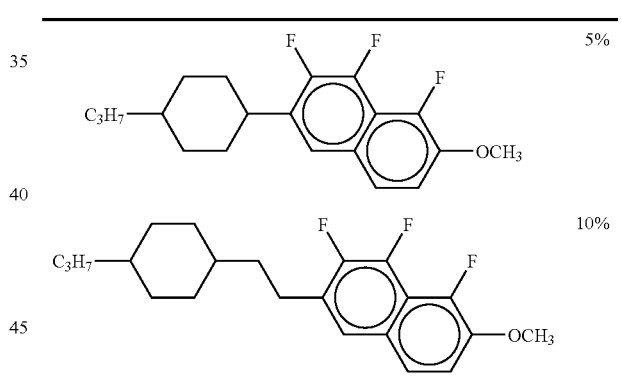 5%

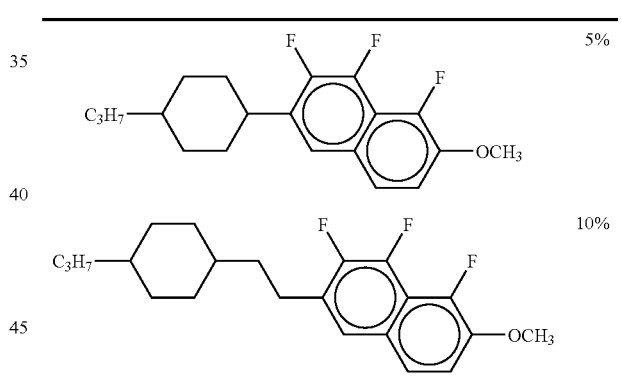 10%

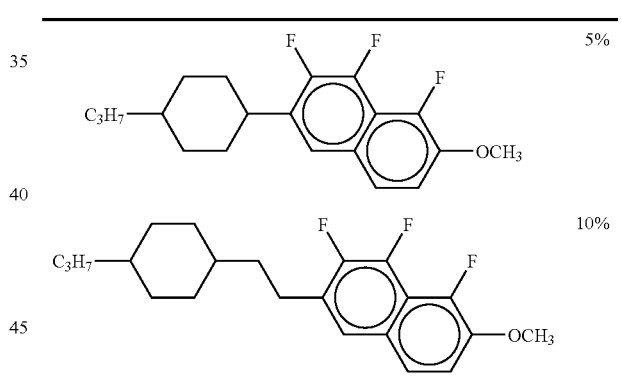 10%

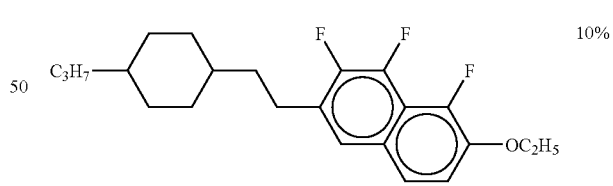 10%

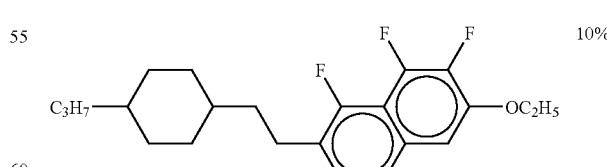 10%

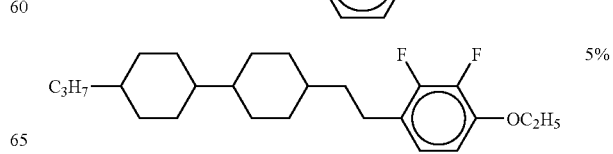 5%

-continued

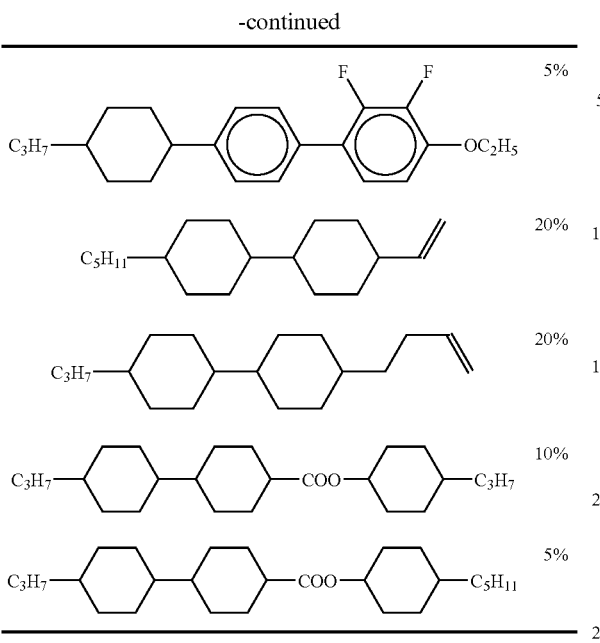

$T_{N-I}$: 94.8° C.
Δε: −4.2
Δn: 0.092
η: 20.8 mPa·s
Vth: 2.06 V
γ: 1.97
VHR: 99.5%

The liquid crystal composition of Example 11 has a low viscosity. It is suited for use as VA-LCDs for such applications as liquid crystal televisions which require a high-speed response.

EXAMPLE 12

The following liquid crystal compositions were prepared and properties were measured.

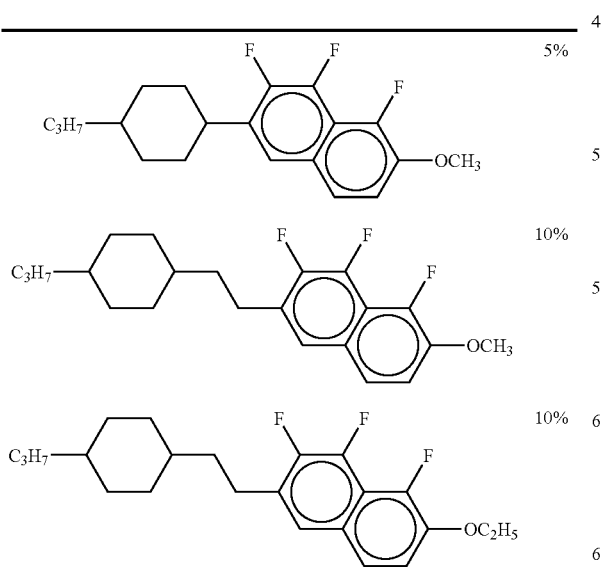

-continued

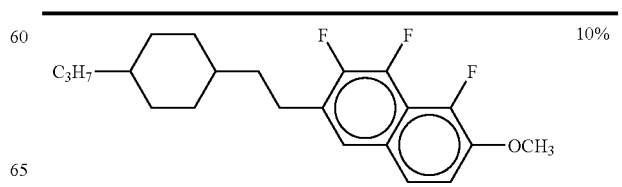

$T_{N-I}$: 100.1° C.
Δε: −4.8
Δn: 0.091
η: 24.1 mPa·s
Vth: 1.80 V
γ: 1.91
VHR: 99.4%

The liquid crystal composition of Example 12 has a high nematic-isotropic liquid phase transition temperature ($T_{N-I}$) and a low viscosity. It is suited for use as VA-LCDs for such applications as liquid crystal televisions which require a high-speed response, cellular phones which require a wide range of a liquid crystal temperature, and PDAs.

EXAMPLE 13

The following liquid crystal compositions were prepared and properties were measured.

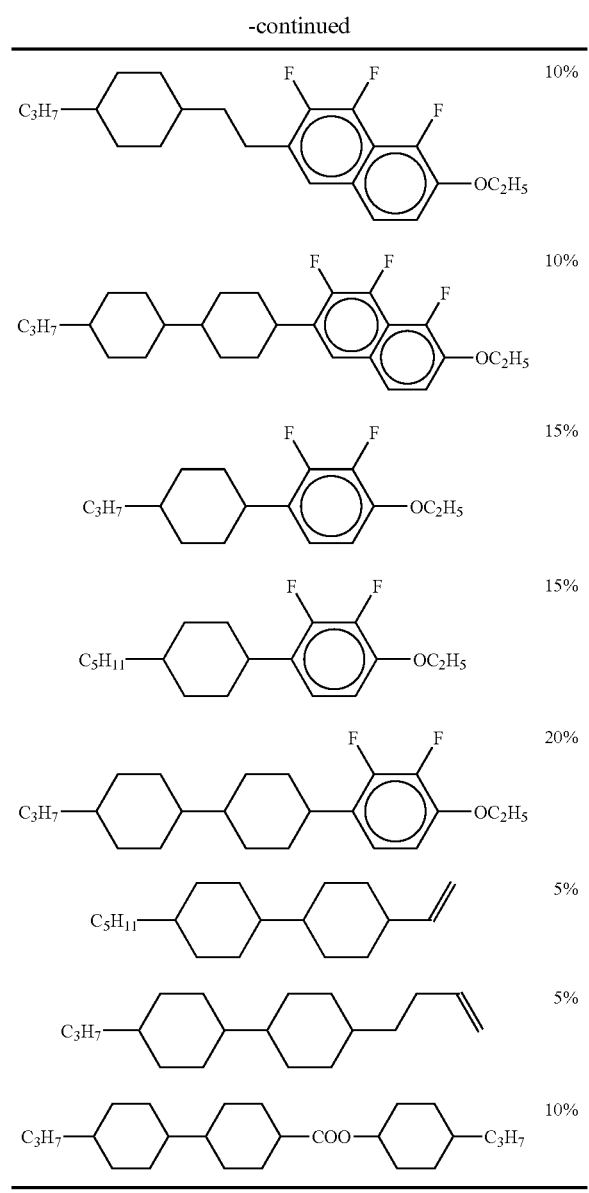
COMPARATIVE EXAMPLE 3
In Comparative Example 3, the following liquid crystal compositions were prepared and properties were measured.
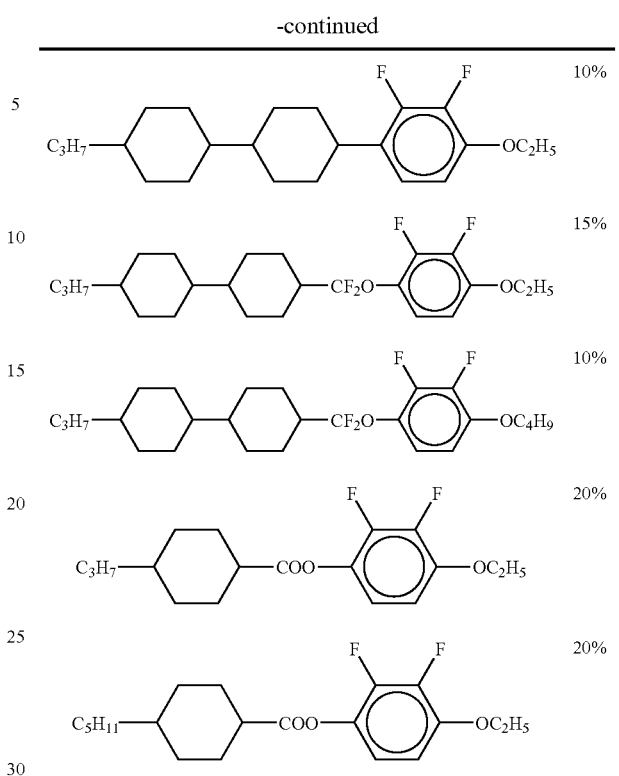
COMPARATIVE EXAMPLE 4
In Comparative Example 4, the following liquid crystal compositions were prepared and properties were measured.
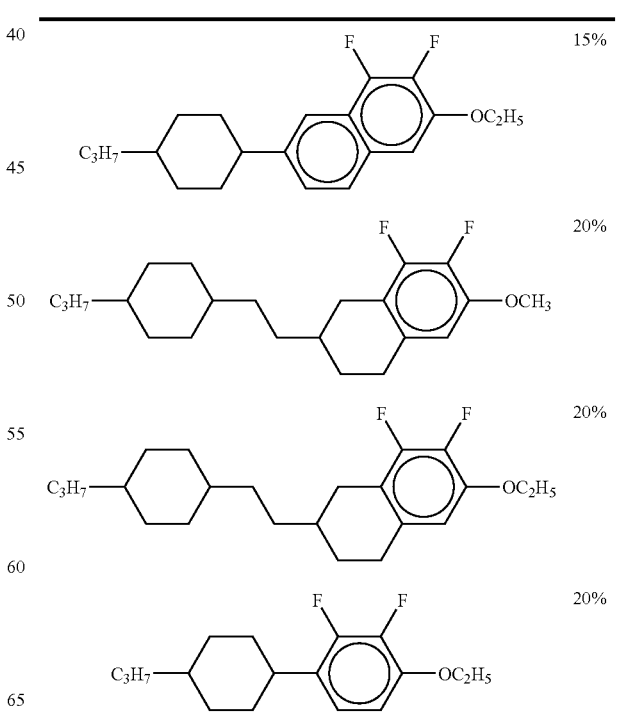

-continued

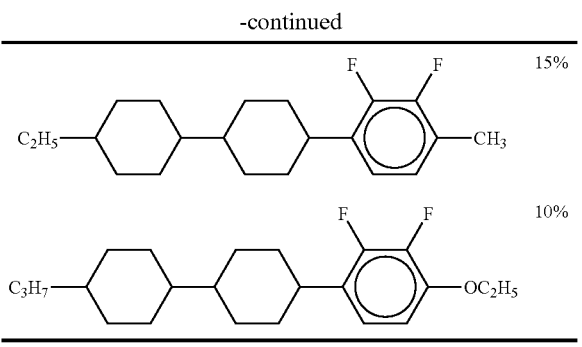

15%

10%

The measurement results of Example 13 and Comparative Examples 3 and 4 are shown in the following table.

TABLE 3

Physical properties of Example 13 and Comparative Examples 3 and 4

| | Example 13 | Comparative Example 3 | Comparative Example 4 |
|---|---|---|---|
| $T_{N-I}$ (° C.) | 86.9 | 72.0 | 79.8 |
| Δε | −8.1 | −7.6 | −5.8 |
| η (mPa · s) | 31.7 | 43.0 | 42.9 |
| Δn | 0.095 | 0.094 | 0.110 |
| Vth (V) | 1.35 | — | — |
| VHR (%) | 99.2 | 91.0 | 99.6% |

The liquid crystal composition of Example 13 is a liquid crystal composition which has considerably large absolute value of the dielectric constant anisotropy. On the other hand, the liquid crystal composition of Comparative Example 3 has comparatively high absolute value of the dielectric constant anisotropy, but has a low nematic phase-isotropic liquid phase transition temperature ($T_{N-I}$) and a high viscosity. Since a compound having —OCF$_2$— and an ester bond as a coupling group is used, the voltage holding ratio is low and it is hard to use for active matrix.

With the composition of Comparative Example 4, the absolute value of the dielectric constant anisotropy is considerably smaller than that of the examples and it is disadvantageous to driving at a low voltage and also the viscosity is considerably high.

The liquid crystal composition of Example 13 has a negative dielectric constant anisotropy having a large absolute value, and a high holding ratio. It is suited for use as VA-LCDs for such applications as liquid crystal televisions which require a high reliability and driving at a low voltage, cellular phones, and PDAs.

EXAMPLE 14

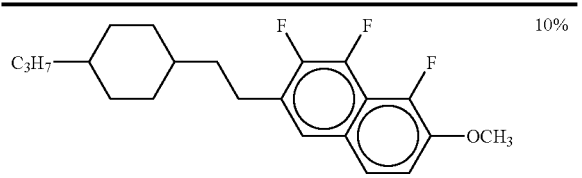

10%

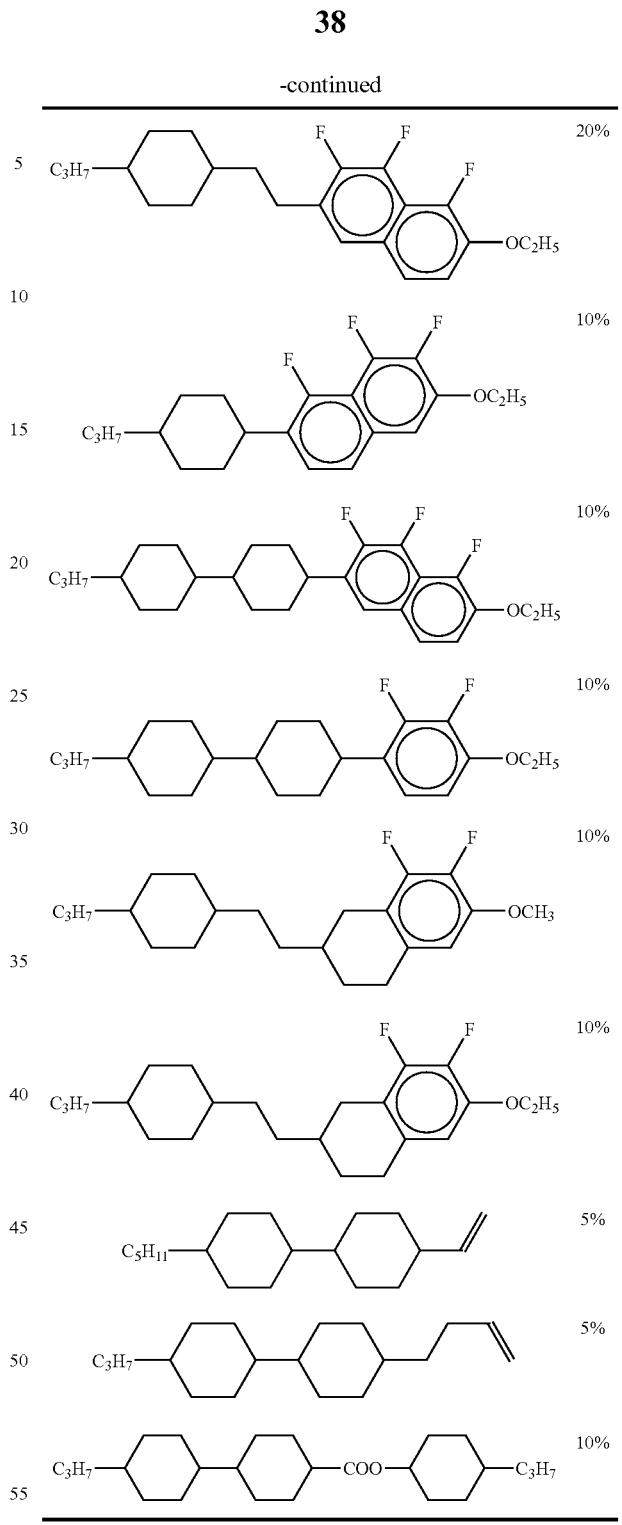

$T_{N-I}$: 98.5° C.
Δε: −9.1
Δn: 0.115
η: 40.9 mPa · s
VHR: 99.2%

The liquid crystal composition of Example 14 has a high nematic phase-isotropic liquid phase transition temperature ($T_{N-I}$), a negative dielectric constant anisotropy having a large absolute value, and a high holding ratio. It is suited for use as VA-LCDs for such applications as liquid crystal televisions which require a high reliability and driving at a low voltage, cellular phones which require a wide range of a liquid crystal temperature, and PDAs.

EXAMPLE 15

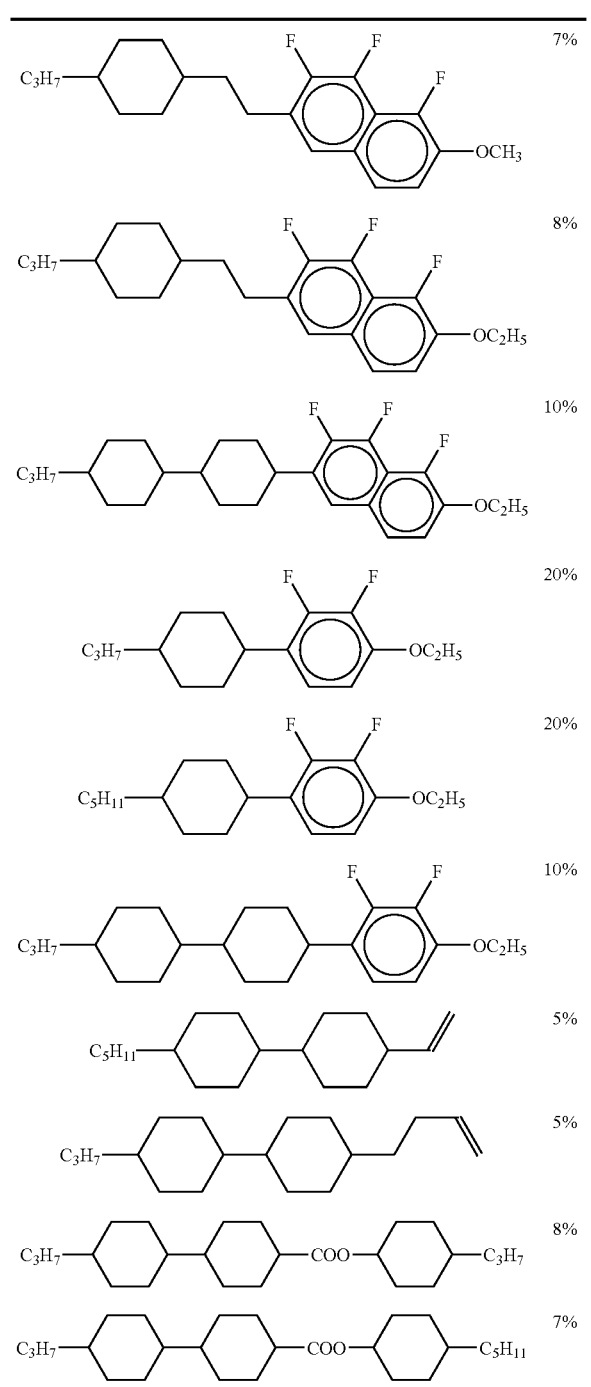

$T_{N-I}$: 80.1° C.
$\Delta\epsilon$: −7.3
$\Delta n$: 0.086
$\eta$: 27.1 mPa·s
VHR: 99.3%

The liquid crystal composition of Example 15 has a negative dielectric constant anisotropy having a large absolute value, and a high holding ratio. It is suited for use as VA-LCDs for such applications as liquid crystal televisions which require a high reliability and driving at a low voltage, cellular phones, and PDAs.

EXAMPLE 16

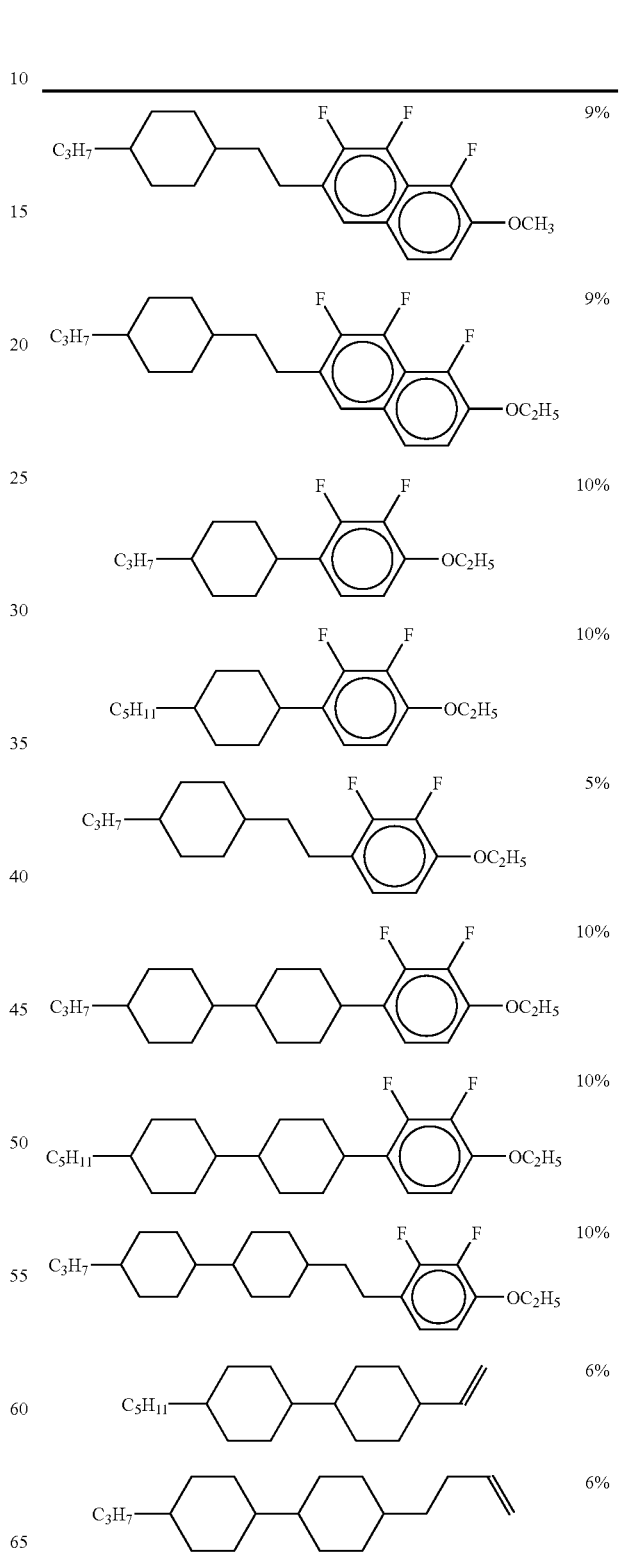

-continued

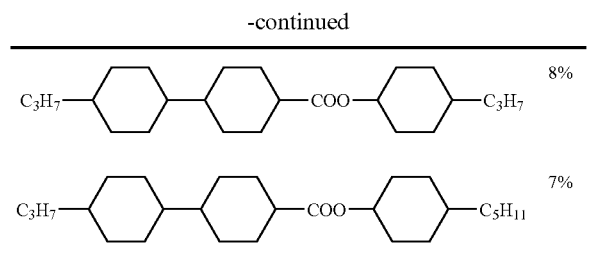

$T_{N-I}$: 103.2° C.
Δε: −7.2
Δn: 0.91
η: 28.8 mPa·s
VHR: 99.4%

The liquid crystal composition of Example 16 has a high nematic phase-isotropic liquid phase transition temperature ($T_{N-I}$), a negative dielectric constant anisotropy having a large absolute value, and a high holding ratio. It is suited for use as VA-LCDs for such applications as liquid crystal televisions which require a high reliability and driving at a low voltage, cellular phones which require a wide range of a liquid crystal temperature, and PDAs.

EXAMPLE 17

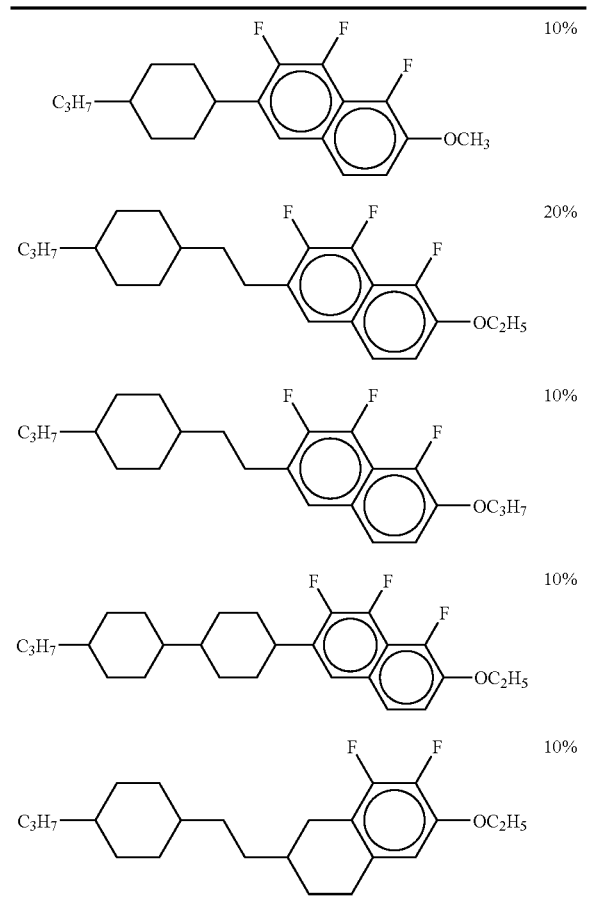

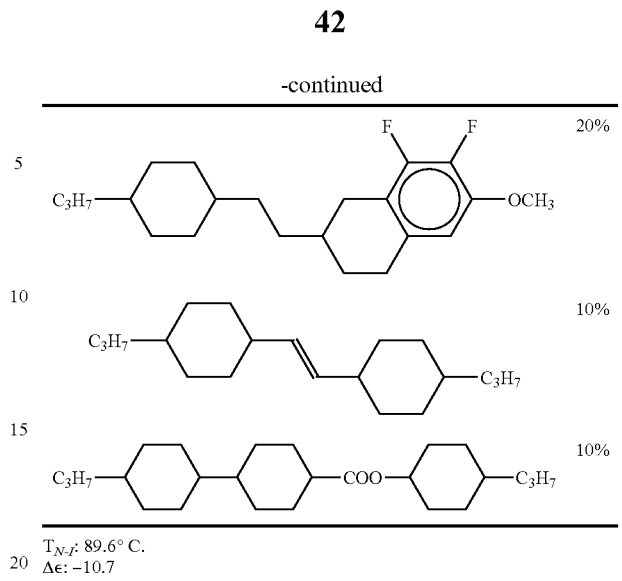

$T_{N-I}$: 89.6° C.
Δε: −10.7
Δn: 0.116
η: 39.9 mPa·s
Vth: 1.22 V
γ: 1.82
VHR: 99.4%

The liquid crystal composition of Example 17 has a negative dielectric constant anisotropy having a large absolute value, and a high holding ratio. It is suited for use as VA-LCDs for such applications as liquid crystal televisions which require a high reliability and driving at a low voltage, cellular phones, and PDAs.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

The invention claimed is:

1. A nematic liquid crystal composition comprising
at least one compound selected from the group of compounds represented by the general formulas (IA), (IA-1), (IA-3), (IB), (IB-1) and (IB-3), the total content being from 10 to 40% by mass, at least one compound selected from the group of compounds represented by the general formulas (IIA), (IIA-1), (IIA-3), (IIA-5), (IIB), (IIB-1) (IIB-3), (IIB-5), (IIC), (IIC-3), (IIC-7), (IIC-9), (IIC-10) and (IID), the total content being from 10 to 70% by mass, the content of the compound represented by the general formula (IIC), (IIC-3), (IIC-7), (IIC-9) and (IIC-10) being from 10 to 40% by mass, the total content of the compounds selected from the group of compounds represented by the general formulas (IA), (IA-1), (IA-3), (IB), (IB-1), (IB-3), (IIC), (IIC-3), (IIC-7), (IIC-9) and (IIC-10) being from 45 to 70% by mass,
the total content of at least one compound selected from the group of compounds represented by the general formulas (IA), (IA-1), (IA-3), (IB), (IB-1), (IB-3), (IIA), (IIA-1), (IIA-3), (IIA-5), (IIB), (IIB-1), (IIB-3), (IIB-5), (IIC), (IIC-3), (IIC-7), (IIC-9), (IIC-10) and (IID) being from 35 to 80% by mass, and
a compound represented by the general formula (III) in the content of 20 to 65% by mass,
wherein a dielectric constant anisotropy is within a range from −12 to −3, a nematic phase-isotropic liquid phase transition temperature ($T_{N-I}$) is within a range from 80 to 120° C., and a viscosity is 45 mPa·s or less:
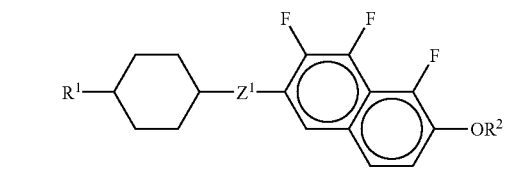
(IA)
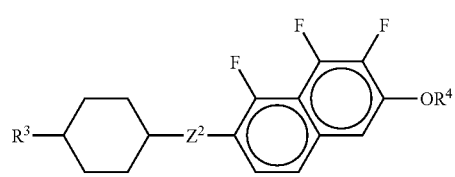
(IB)
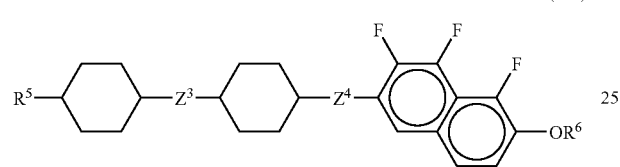
(IIA)
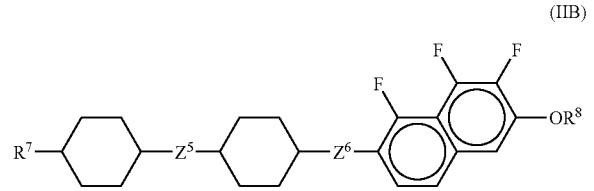
(IIB)
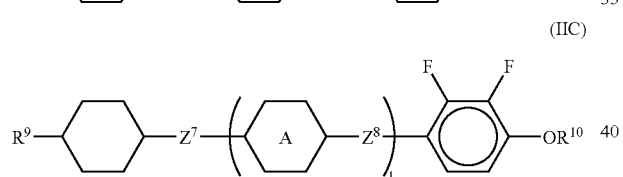
(IIC)
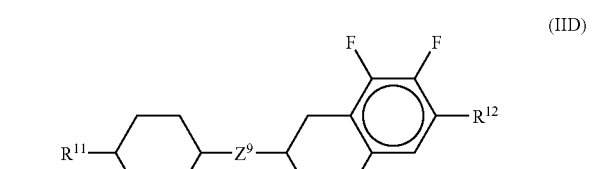
(IID)
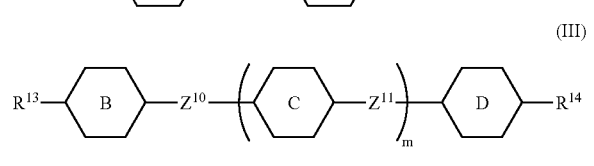
(III)
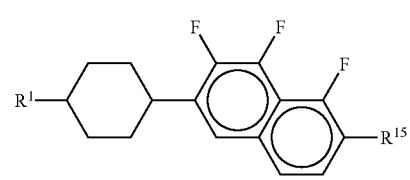
(IA-1)
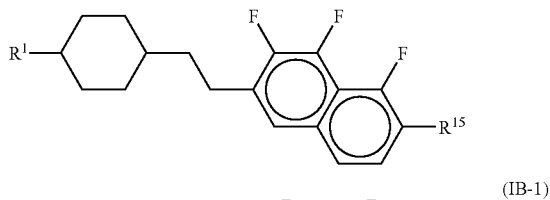
(IA-3)
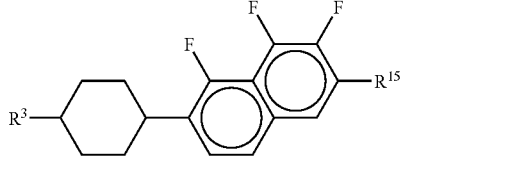
(IB-1)
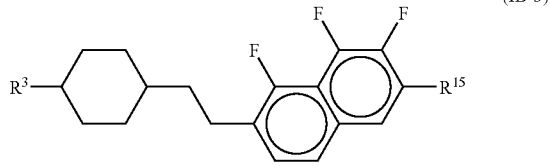
(IB-3)
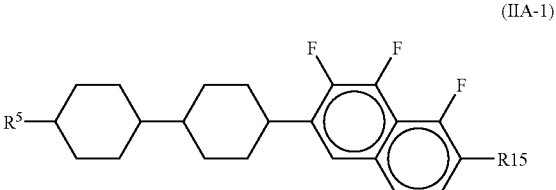
(IIA-1)
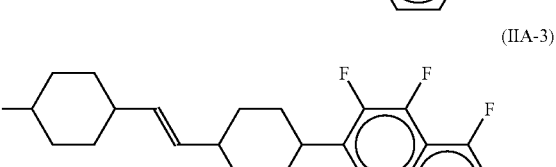
(IIA-3)
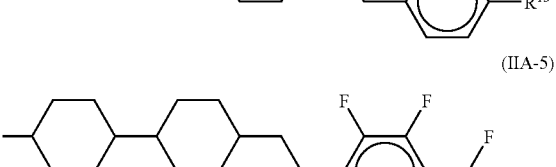
(IIA-5)
(IIB-1)
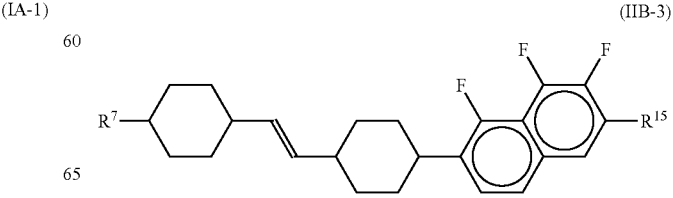
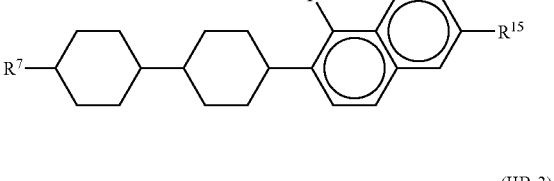
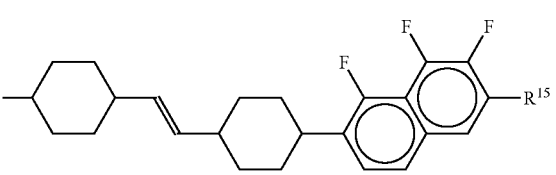
(IIB-3)

-continued (IIB-5)

R⁷—[Cy]—[Cy]—CH₂CH₂—[Ph(F,F,F)]—R¹⁵

(IIC-3)

R⁹—[Cy]—[Cy]—[Ph(F,F)]—R¹⁵

(IIC-7)

R⁹—[Cy]—[Ph]—[Ph(F,F)]—R¹⁵

(IIC-9)

R⁹—[Ph]—[Ph]—[Ph(F,F)]—R¹⁵

(IIC-10)

R⁹—[Ph]—[Ph(F,F)]—[Ph]—R¹⁵ wherein $R^1$, $R^3$, $R^5$, $R^7$, $R^9$, $R^{11}$, $R^{12}$, $R^{13}$ and $R^{14}$ each independently represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one, or two or more CH₂ groups, which are present in said alkyl group, said alkoxy group, said alkenyl group or said alkenyloxy group, may be substituted with —O—, —CO— or —COO—, while O atoms do not bond with each other directly;

$R^2$, $R^4$, $R^6$, $R^8$ and $R^{10}$ each independently represents an alkyl group having 1 to 10 carbon atoms, or an alkenyl group having 2 to 10 carbon atoms, and one, or two or more CH₂ groups, which are present in said alkyl group, or said alkenyl group, may be substituted with —O—, —CO— or —COO—, while O atoms do not bond with each other directly; and $Z^1$ to $Z^6$ and $Z^9$ to $Z^{11}$ each independently represents a single bond, —CH₂CH₂—, —CH=CH—, —CH₂CH₂CH₂CH₂—, —CH₂CH₂CH₂O—, —OCH₂CH₂CH₂—, —CH=CHCH₂CH₂—, —CH₂CH₂CH=CH—, —C≡C—, —CH₂O—, —OCH₂—, —CF₂O—, —COO—, or —OCO—;

$Z^7$ and $Z^8$ each independently represents a single bond, —CH₂CH₂—, —CH=CH—, —CH₂CH₂CH₂CH₂—, —CH₂CH₂CH₂O—, —OCH₂CH₂CH₂—, —CH=CHCH₂CH₂—, —CH₂CH₂CH=CH—, —C≡C—, —CH₂O—, or —OCH₂—; 1 and m represents 0 or 1;

A represents a trans-1,4-cyclohexylene group or a 1,4-phenylene group; and

B, C and D each independently represents a trans-1,4-cyclohexylene group, a 1,4-phenylene group, or a trans-1,4-cyclohexenylene group;

and $R^{15}$ represents an alkyl group having 1 to 10 carbon atoms or an alkenyl group having 2 to 10 carbon atoms.

2. A nematic liquid crystal composition comprising at least one compound selected from the group of compounds represented by the general formulas (IA), (IA-1), (IA-3), (IB), (IB-1) and (IB-3), the total content being from 25 to 60% by mass, at least one compound selected from the group of compounds represented by the general formulas (IIA), (IIA-1), (IIA-3), (IIA-5), (IIB), (IIB-1), (IIB-3), (IIB-5), (IIC), (IIC-3), (IIC-7), (IIC-9), (IIC-10) and (IID), the total content being from 10 to 70% by mass, the total content of the compounds selected from the general formulas (IA), (IA-1), (IA-3), (IB), (IB-1), (IB-3), (IIA), (IIA-1), (IIA-3), (IIA-5), (IIB), (IIB-1), (IIB-3) and (IIB-5), being from 35 to 65% by mass, the total content of at least one compound selected from the group of compounds represented by the general formulas (IA), (IA-1), (IA-3), (IB), (IB-1), (IB-3), (IIA), (IIA-1), (IIA-3), (IIA-5), (IIB), (IIB-1), (IIB-3), (IIB-5), (IIC), (IIC-3), (IIC-7), (IIC-9), (IIC-10) and (IID) being from 35 to 80% by mass, and a compound represented by the general formula (III) in the content of 20 to 65% by mass, wherein a dielectric constant anisotropy is within a range from −12 to −3, a nematic phase-isotropic liquid phase transition temperature ($T_{N-I}$) is within a range from 80 to 120° C., and a viscosity is 45 mPa·s or less:

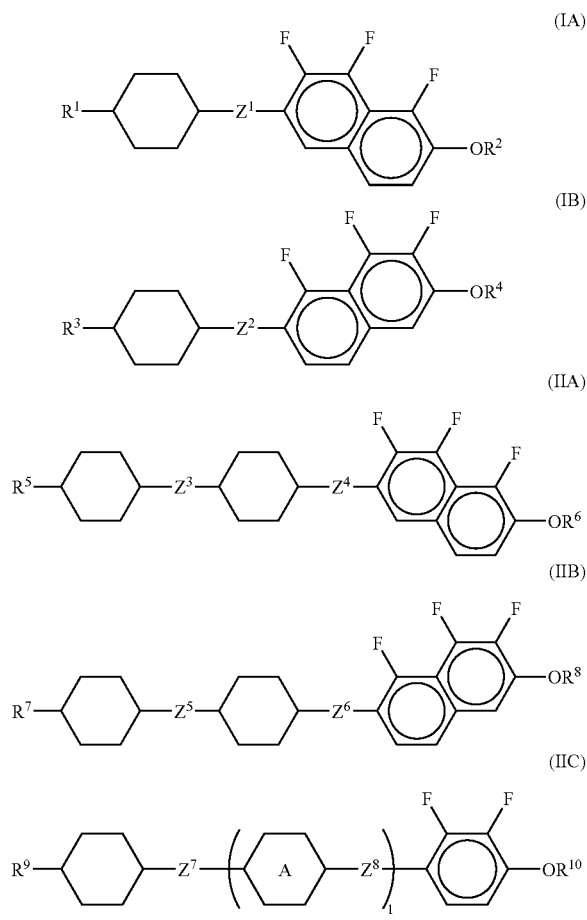

-continued

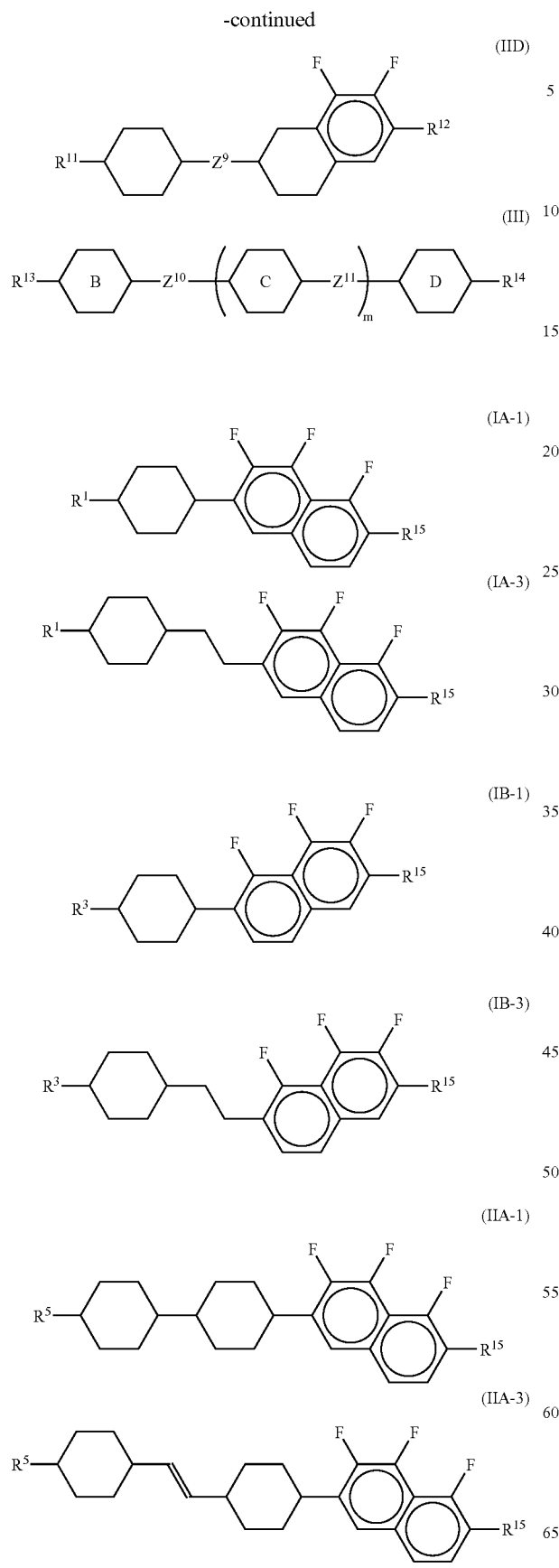
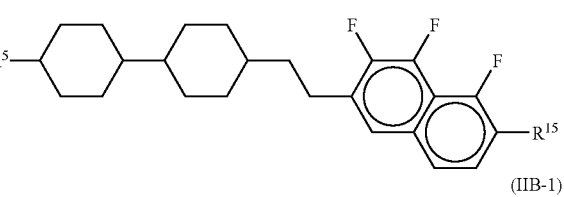
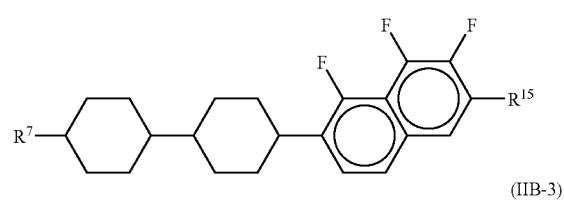
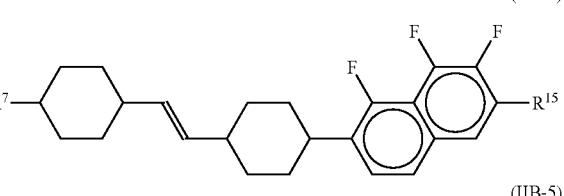
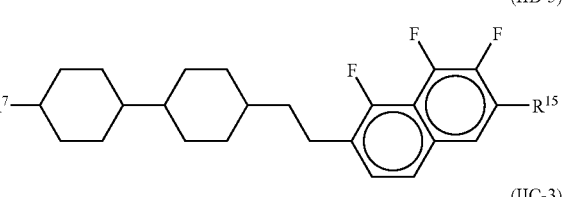
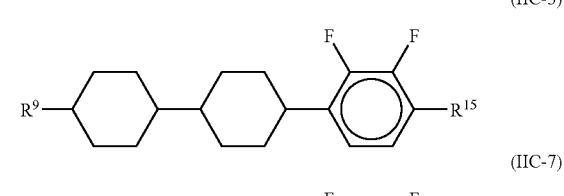
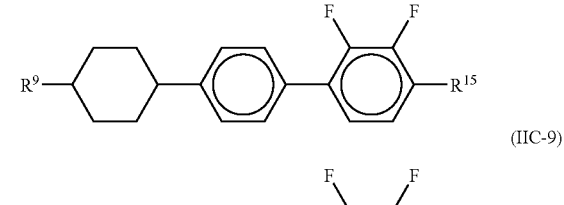
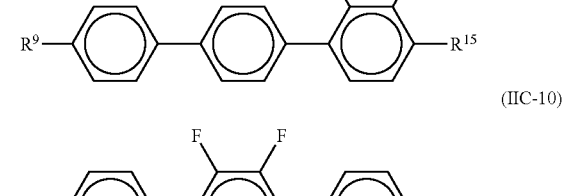
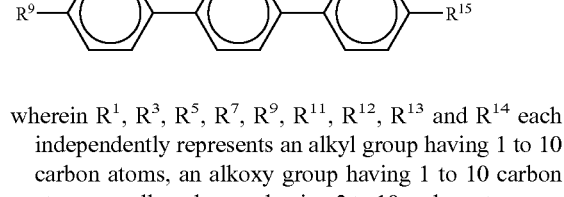

wherein $R^1$, $R^3$, $R^5$, $R^7$, $R^9$, $R^{11}$, $R^{12}$, $R^{13}$ and $R^{14}$ each independently represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one, or two or more CH$_2$ groups, which are present in said alkyl group, said alkoxy group, said alkenyl group or said alkenyloxy group, may be substituted with —O—, —CO— or —COO—, while O atoms do not bond with each other directly;

$R^2$, $R^4$, $R^6$, $R^8$ and $R^{10}$ each independently represents an alkyl group having 1 to 10 carbon atoms, or an alkenyl group having 2 to 10 carbon atoms, and one or two or more $CH_2$ groups, which are present in said alkyl group, said alkoxy group, said alkenyl group or said alkenyloxy group, may be substituted with —O—, —CO— or —COO—, while O atoms do not bond with each other directly; and $Z^1$ to $Z^6$ and $Z^9$ to $Z^{11}$ each independently represents a single bond, —$CH_2CH_2$—, —CH=CH—, —$CH_2CH_2CH_2CH_2$—, —$CH_2CH_2CH_2O$—, —$OCH_2CH_2CH_2$—, —CH=$CHCH_2CH_2$—, —$CH_2CH_2$CH=CH—, —C≡C—, —$CH_2O$—, —$OCH_2$—, —$CF_2O$—, —COO—, or —OCO—; $Z^7$ and $Z^8$ each independently represents a single bond, —$CH_2CH_2$—, —CH=CH—, —$CH_2CH_2CH_2CH_2$—, —$CH_2CH_2CH_2O$—, —$OCH_2CH_2CH_2$—, —CH=$CHCH_2CH_2$—, —$CH_2CH_2$CH=CH—, —C≡C—, —$CH_2O$—, or —$OCH_2$—; l and m represent 0 or 1; A represents a trans-1,4-cyclohexylene group or a 1,4-phenylene group; and B, C and D each independently represents a trans-1,4-cyclohexylene group, a 1,4-phenylene group, or a trans-1,4-cyclohexenylene group; and $R^{15}$ represents an alkyl group having 1 to 10 carbon atoms or an alkenyl group having 2 to 10 carbon atoms.

3. A nematic liquid crystal composition comprising at least one compound
selected from the group of compounds represented by the general formulas (IA), (IA-1), (IA-3), (IB), (IB-1) and (IB-3), the total content being from 10 to 70% by mass, at least one compound selected from the group of compounds represented by the general formulas (IIA), (IIA-1), (IIA-3), (IIA-5), (IIB), (IIB-1), (IIB-3), (IIB-5), (IIC), (IIC-3), (IIC-7), (IIC-9), (IIC-10) and (IID), the total content being from 10 to 70% by mass, the total content of the compounds selected from the group of compounds selected from the general formulas (IA), (IA-1), (IA-3), (IB), (IB-1), (IB-3), (IIA), (IIA-1), (IIA-3), (IIA-5), (IIB), (IIB-1), (IIB-3) and (IIB-5), being from 20 to 60% by mass, the total content of the compounds selected from the group of compounds represented by the general formulas (IIC), (IIC-3), (IIC-7), (IIC-9), (IIC-10) and (IID) being from 30 to 60% by mass, the total content of the compounds selected from the group of compounds represented by the general formulas (IA), (IA-1), (IA-3), (IB), (IB-1), (IB-3), (IIA), (IIA-1), (IIA-3), (IIA-5), (IIB), (IIB-1), (IIB3), (IIB-5), (IIC), (IIC-3), (IIC-7), (IIC9), (IIC-10) and (IID) being from 35 to 80% by mass, and a compound represented by the general formula (III) in the content of 20 to 65% by mass, wherein a dielectric constant anisotropy is within a range from −12 to −3, a nematic phase-isotropic liquid phase transition temperature ($T_{N-I}$) is within a range from 80 to 120° C., and a viscosity is 45 mPa·s or less:

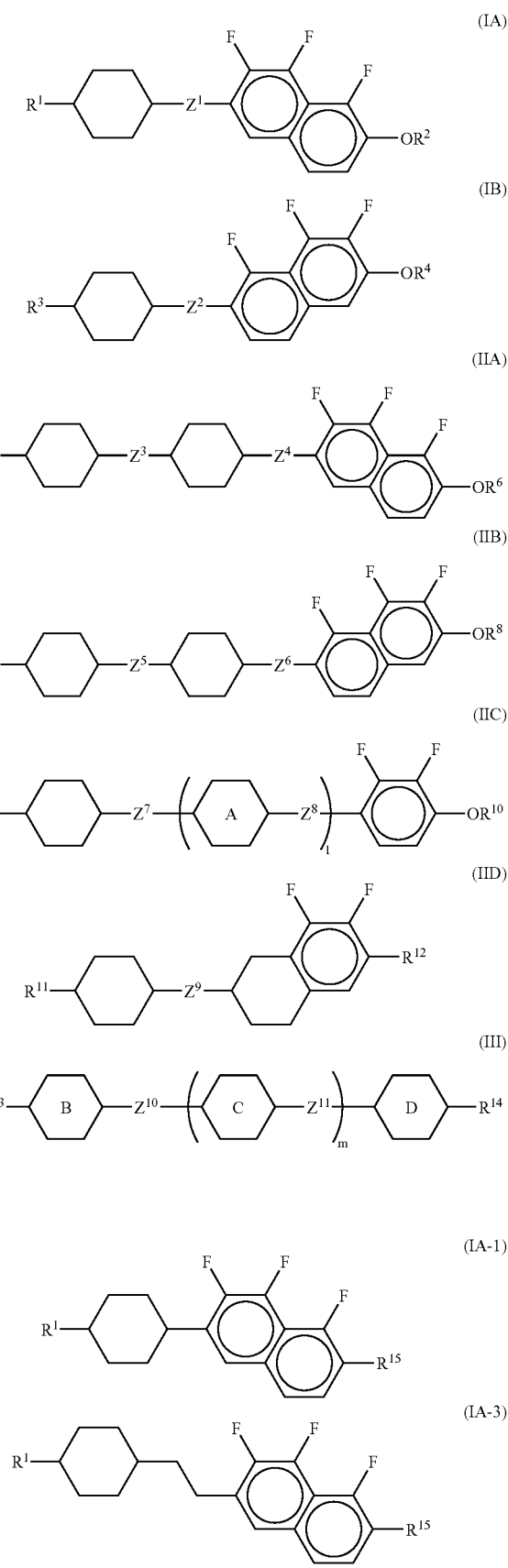

-continued

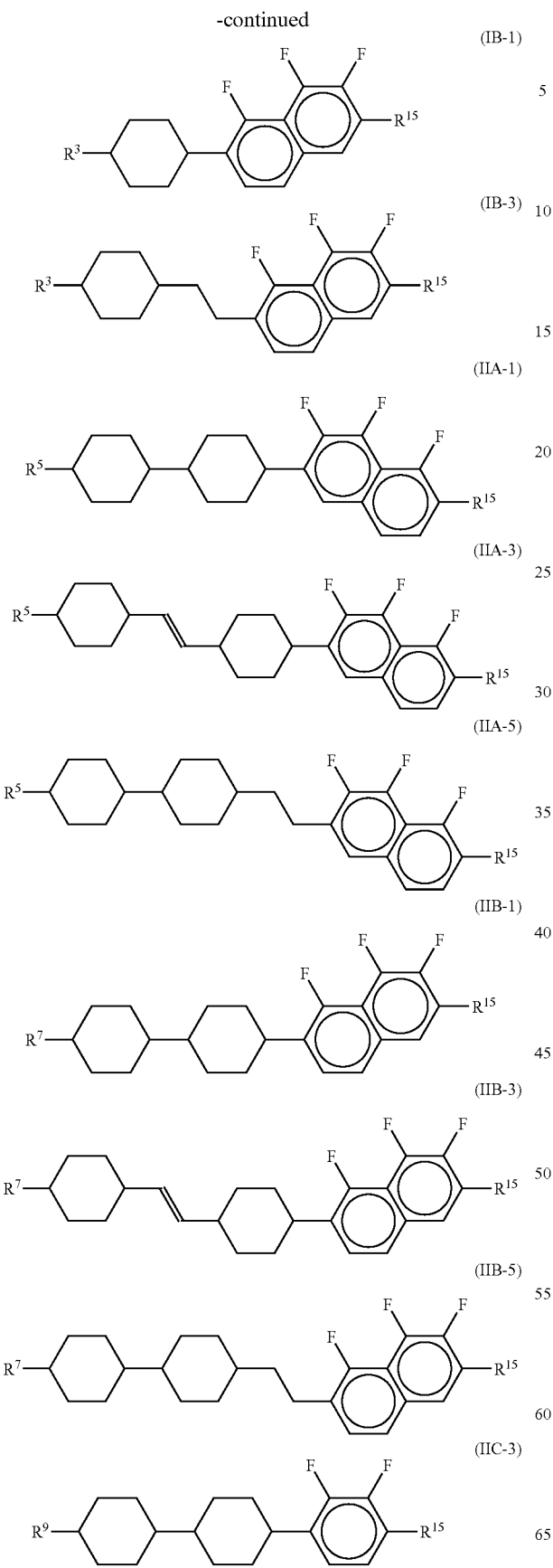
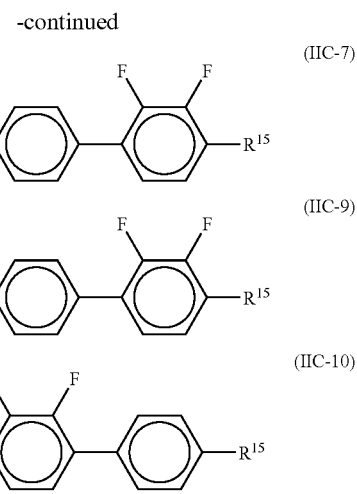

wherein $R^1$, $R^3$, $R^5$, $R^7$, $R^9$, $R^{11}$, $R^{12}$, $R^{13}$ and $R^{14}$ each independently represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one, or two or more $CH_2$ groups, which are present in said alkyl group, said alkoxy group, said alkenyl group or said alkenyloxy group, may be substituted with —O—, —CO— or —COO—, while O atoms do not bond with each other directly;

$R^2$, $R^4$, $R^6$, $R^8$ and $R^{10}$ each independently represents an alkyl group having 1 to 10 carbon atoms or an alkenyl group having 2 to 10 carbon atoms, and one, or two or more $CH_2$ groups, which are present in said alkyl group, or said alkenyl group, may be substituted with —O—, —CO— or —COO—, while O atoms do not bond with each other directly; and $Z^1$ to $Z^6$ and $Z^9$ to $Z^{11}$ each independently represents a single bond, —$CH_2CH_2$—, —CH=CH—, —$CH_2CH_2CH_2CH_2$—, —$CH_2CH_2CH_2O$—, —$OCH_2CH_2CH_2$—, —CH=CHCH$_2$CH$_2$—, —$CH_2CH_2$CH=CH—, —C≡C—, —$CH_2O$—, —$OCH_2$—, —$CF_2O$—, —COO—, or —OCO—; $Z^7$ and $Z^8$ each independently represents a single bond, —$CH_2CH_2$—, —CH=CH—, —$CH_2CH_2CH_2CH_2$—, —$CH_2CH_2CH_2O$—, —$OCH_2CH_2CH_2$—, —CH=CHCH$_2$CH$_2$—, —$CH_2CH_2$CH=CH—, —C≡C—, —$CH_2O$—, or —$OCH_2$—; l and m represent 0 or 1; A represents a trans-1,4-cyclohexylene group or a 1,4-phenylene group; and B, C and D each independently represents a trans-1,4-cyclohexylene group, a 1,4-phenylene group, or a trans-1,4-cyclohexenylene group; and $R^{15}$ represents an alkyl group having 1 to 10 carbon atoms or an alkenyl group having 2 to 10 carbon atoms.

4. The nematic liquid crystal composition according to claim 1, wherein the compound represented by the general formula (IA) comprises compounds represented by the general formulas (IA-2) or (IA-4), and the compound represented by the general formula (IB) comprises compounds represented by the general formulas (IB-2) or (IB-4):

(IA-2)
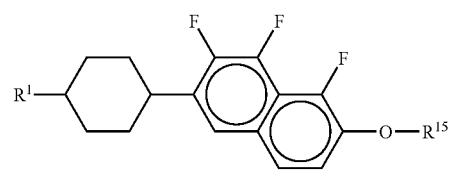

(IA-4)
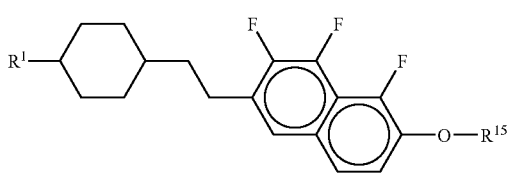

(IB-2)
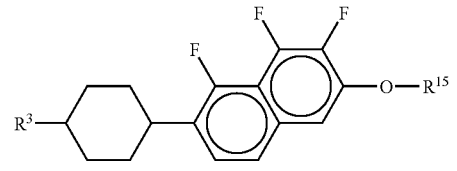

(IB-4)
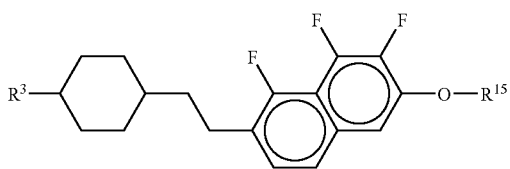

wherein $R^1$ and $R^3$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more $CH_2$ groups, which are present in said alkyl group, said alkoxy group, said alkenyl group or said alkenyloxy group, may be substituted with —O—, —CO— or —COO—, while O atoms do not bond with each other directly; and $R^{15}$ represents an alkyl group having 1 to 10 carbon atoms or an alkenyl group having 2 to 10 carbon atoms.

5. The nematic liquid crystal composition according to claim 1, wherein the compound represented by the general formula (IIA) comprises compounds represented by the general formulas (IIA-2), (IIA-4) or (IIA-6), and the compound represented by the general formula (IIB) comprises compounds represented by the general formulas (IIB-2), (IIB-4) or (IIB-6):

(IIA-2)
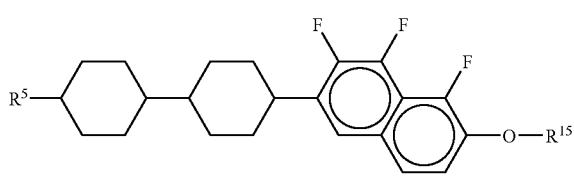

(IIA-4)
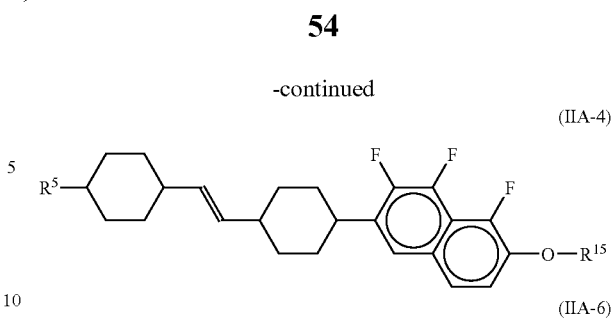

(IIA-6)
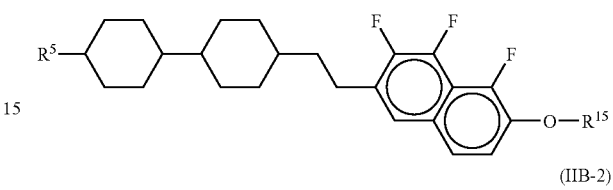

(IIB-2)
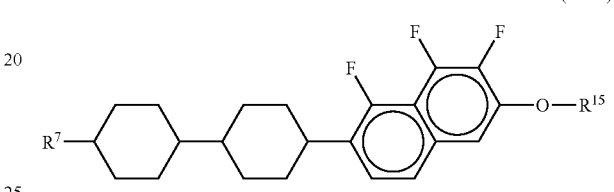

(IIB-4)
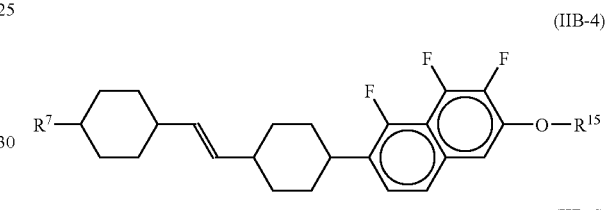

(IIB-6)
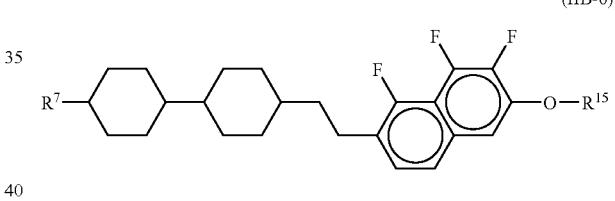

wherein $R^5$ and $R^7$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

6. The nematic liquid crystal composition according to claim 1, wherein the compound represented by the general formula (IIC) comprises compounds represented by the general formulas (IIC-1), (IIC-2), (IIC-4), (IIC-5), (IIC-6) or (IIC-8):

(IIC-1)
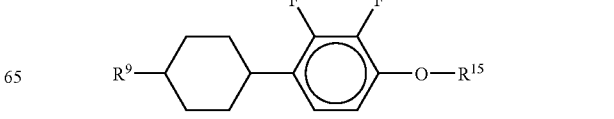

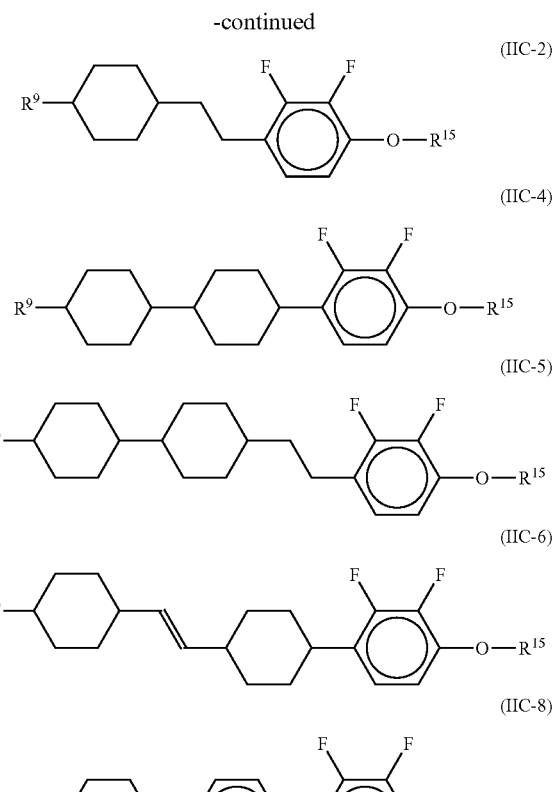

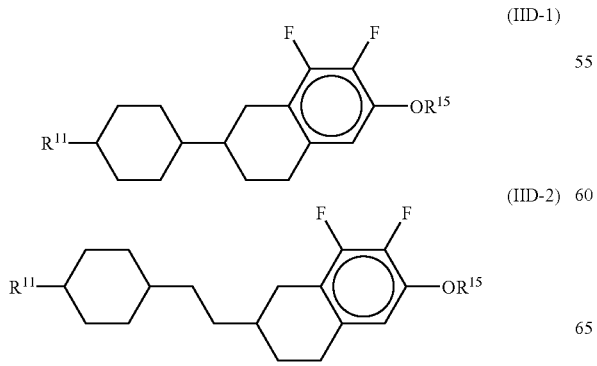

wherein $R^9$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more $CH_2$ groups, which are represent in said alkyl group, said alkoxy group, said alkenyl group or said alkenyloxy group, may be substituted with —O—, —CO—, or —COO—, while O atoms do not bond with each other directly, and $R^{15}$ represents an alkyl group having 1 to 10 carbon atoms or an alkenyl group having 2 to 10 carbon atoms.

7. The nematic liquid crystal composition according to claim 1, wherein the compound represented by the general formula (IID) comprises compounds represented by the general formulas (IID-1) to (IID-3):

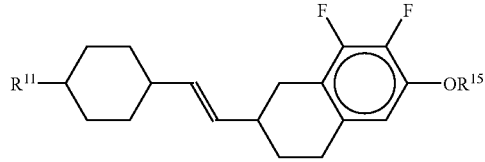

wherein $R^{11}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

8. The nematic liquid crystal composition according to claim 1, wherein the compound represented by the general formula (III) comprises compounds represented by the general formulas (III-1) to (III-22):

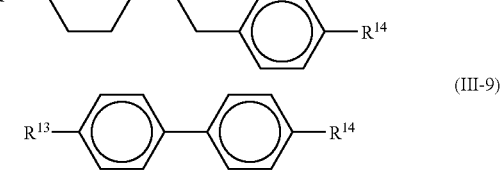

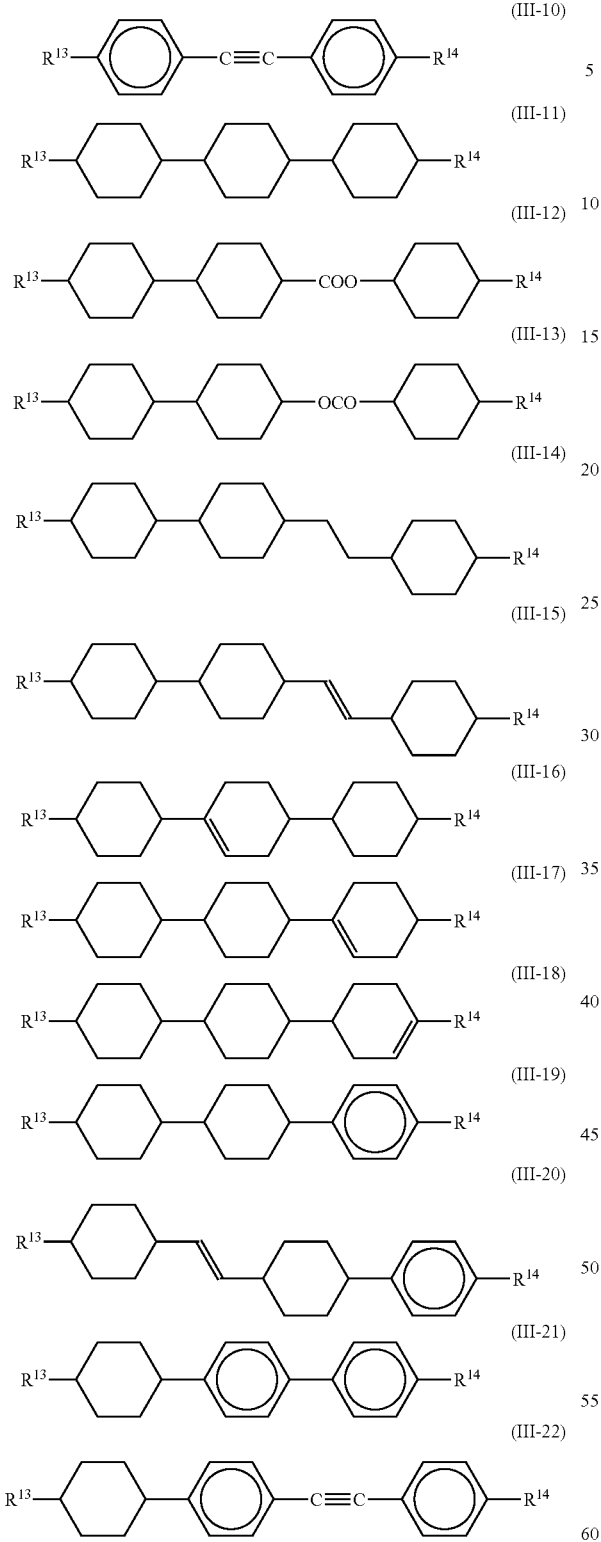

wherein $R^{13}$ and $R^{14}$ represent an alkyl group having 1 to 10 carbon atoms, an alkoxy group having 1 to 10 carbon atoms, an alkenyl group having 2 to 10 carbon atom, or an alkenyloxy group having 2 to 10 carbon atoms, one or more CH$_2$ groups, which are present in said alkyl group, said alkoxy group, said alkenyl group or said alkenyloxy group, may be substituted with —O—, —CO— or —COO—, while O atoms do not bond with each other directly, each substituent independently represents an alkyl group having 1 to 5 carbon atoms or an alkenyl group having 2 to 5 carbon atoms.

9. The nematic liquid crystal composition according to claim 4, wherein the dielectric constant anisotropy is within a range from −12 to −6, the nematic phase-isotropic liquid phase transition temperature ($T_{N-I}$) is within a range from 80 to 120° C., the refractive index anisotropy is within a range from 0.07 to 0.15, and the viscosity is 45 mPa·s or less.

10. A liquid crystal display device for active matrix display, using the nematic liquid crystal composition according to claim 1.

11. A liquid crystal display device for VA mode, IPS mode or ECB mode, using the nematic liquid crystal composition according to claim 1.

12. The nematic liquid crystal composition according to claim 2, wherein the compound represented by the general formula (IA) comprises compounds represented by the general formulas (IA-2) or (IA-4), and the compound represented by the general formula (IB) comprises compounds represented by the general formulas (IB-2) or (IB-4):

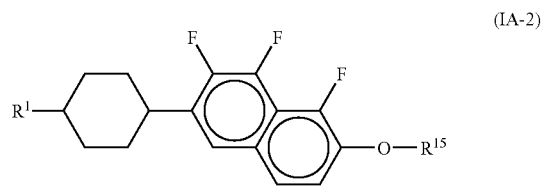

(IA-2)

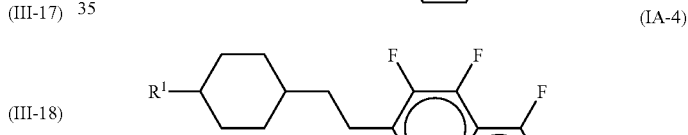

(IA-4)

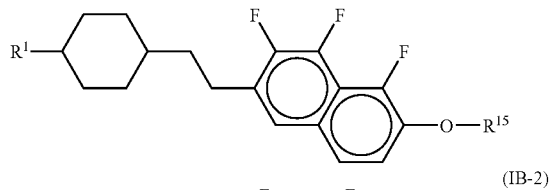

(IB-2)

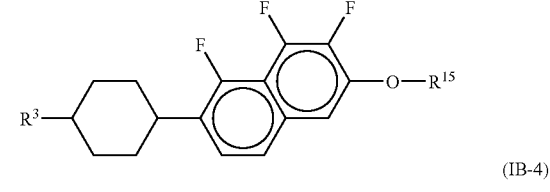

(IB-4)

wherein $R^1$ and $R^3$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more CH$_2$ groups, which are present in said alkyl group, said alkoxy group, said alkenyl group or said alkenyloxy group, may be substituted with —O—, —CO— or —COO—, while O atoms do not bond with each other directly; and $R^{15}$ represents an alkyl group having 1 to 10 carbon atoms or an alkenyl group having 2 to 10 carbon atoms.

13. The nematic liquid crystal composition according to claim 3, wherein the compound represented by the general formula (IA) comprises compounds represented by the general formulas (IA-2) or (IA-4), and the compound represented by the general formula (IB) comprises compounds represented by the general formulas (IB-2) or (IB-4):

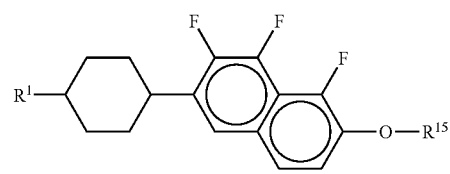

(IA-2)

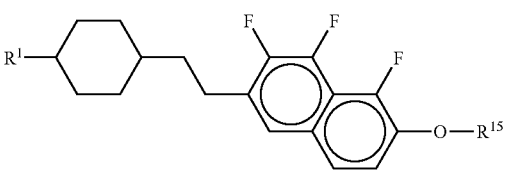

(IA-4)

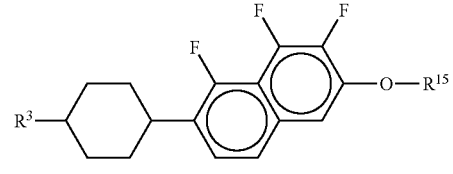

(IB-2)

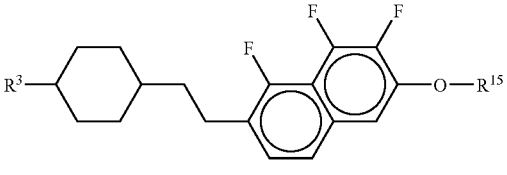

(IB-4)

wherein $R^1$ and $R^3$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more $CH_2$ groups, which are present in said alkyl group, said alkoxy group, said alkenyl group or said alkenyloxy group, may be substituted with —O—, —CO— or —COO—, while O atoms do not bond with each other directly; and $R^{15}$ represents an alkyl group having 1 to 10 carbon atoms or an alkenyl group having 2 to 10 carbon atoms.

14. The nematic liquid crystal composition according to claim 2, wherein the compound represented by the general formula (IIA) comprises compounds represented by the general formulas (IIA-2), (IIA-4) or (IIA-6), and the compound represented by the general formula (IIB) comprises compounds represented by the general formulas (IIB-2), (IIB-4) or (IIB-6):

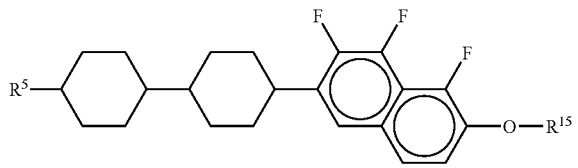

(IIA-2)

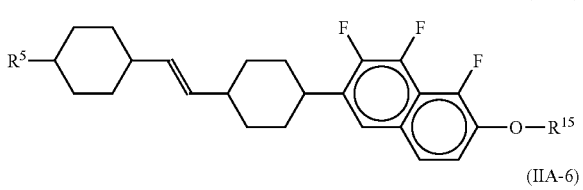

(IIA-4)

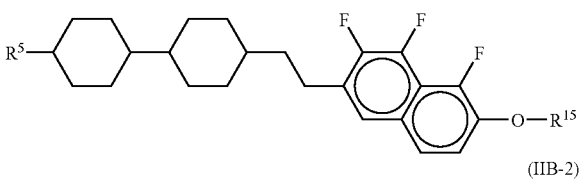

(IIA-6)

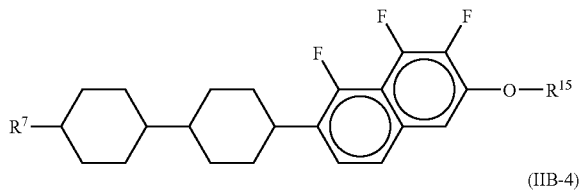

(IIB-2)

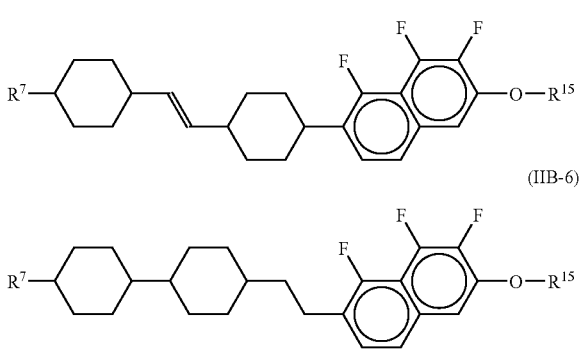

(IIB-4)

(IIB-6)

wherein $R^5$ and $R^7$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

15. The nematic liquid crystal composition according to claim 3, wherein the compound represented by the general formula (IIA) comprises compounds represented by the general formulas (IIA-2), (IIA-4) or (IIA-6), and the compound represented by the general formula (IIB) comprises compounds represented by the general formulas (IIB-2), (IIB-4) or (IIB-6):

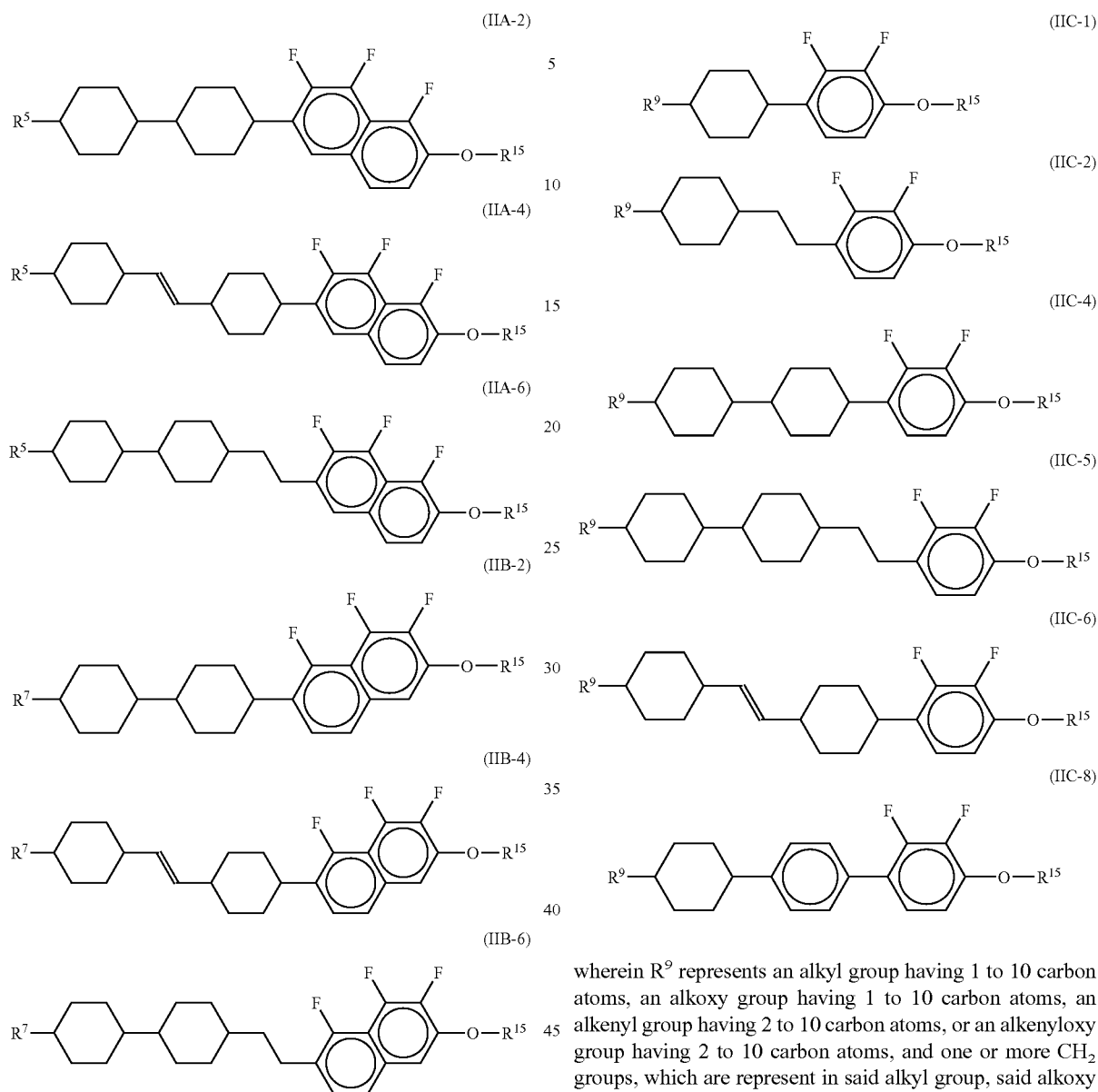

wherein $R^5$ and $R^7$ represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

16. The nematic liquid crystal composition according to claim 2, wherein the compound represented by the general formula (IIC) comprises compounds represented by the general formulas (IIC-1), (IIC-2), (IIC-4), (IIC-5), (IIC-6) or (IIC-8):

wherein $R^9$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more $CH_2$ groups, which are represent in said alkyl group, said alkoxy group, said alkenyl group or said alkenyloxy group, may be substituted with —O—, —CO—, or —COO—, while O atoms do not bond with each other directly, and $R^{15}$ represents an alkyl group having 1 to 10 carbon atoms or an alkenyl group having 2 to 10 carbon atoms.

17. The nematic liquid crystal composition according to claim 2, wherein the compound represented by the general formula (IID) comprises compounds represented by the general formulas (IID-1) to (IID-3):

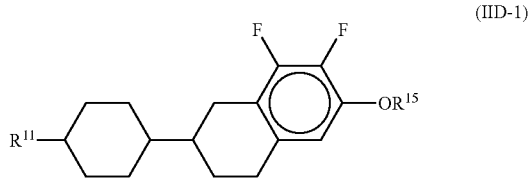

-continued (IID-2)
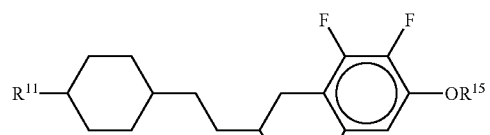

(IID-3)
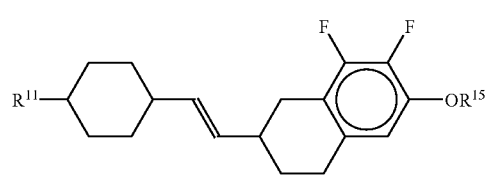

wherein $R^{11}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

18. The nematic liquid crystal composition according to claim 2, wherein the compound represented by the general formula (III) comprises compounds represented by the general formulas (III-1) to (III-22):

(III-1)
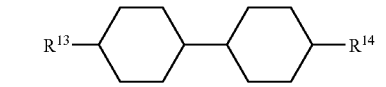

(III-2)
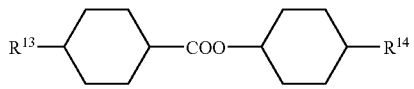

(III-3)
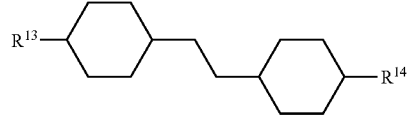

(III-4)
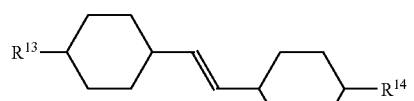

(III-5)
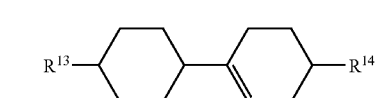

(III-6)
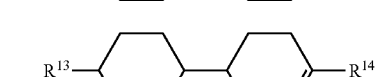

(III-7)
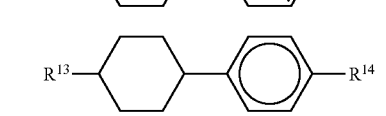

(III-8)
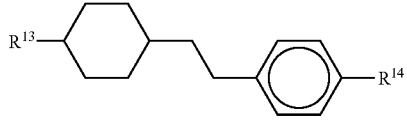

(III-9)
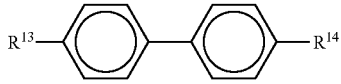

(III-10)
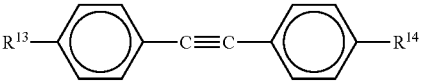

(III-11)

(III-12)
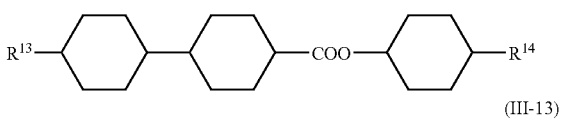

(III-13)
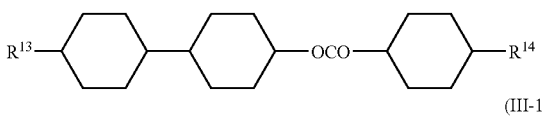

(III-14)
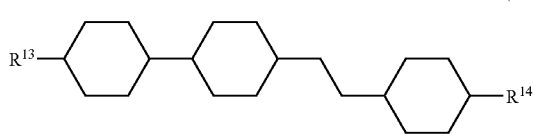

(III-15)
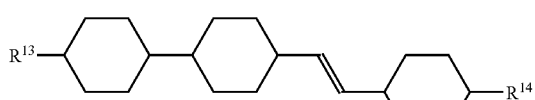

(III-16)
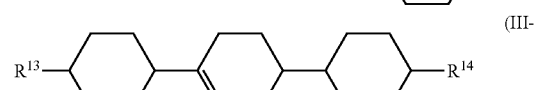

(III-17)
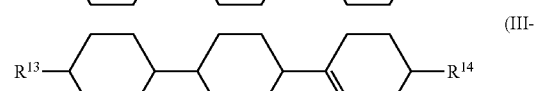

(III-18)
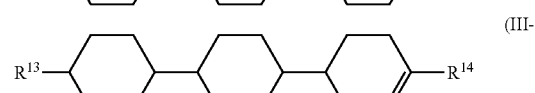

(III-19)
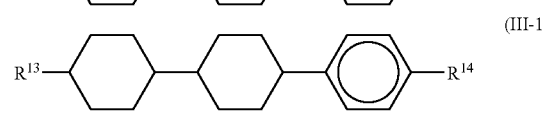

(III-20)

(III-21)
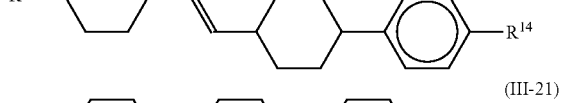

-continued

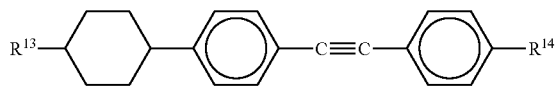
(III-22)

wherein $R^{13}$ and $R^{14}$ represent an alkyl group having 1 to 10 carbon atoms, an alkoxy group having 1 to 10 carbon atoms, an alkenyl group having 2 to 10 carbon atom, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, each substituent independently represents an alkyl group having 1 to 5 carbon atoms or an alkenyl group having 2 to 5 carbon atoms.

19. The nematic liquid crystal composition according to claim 3, wherein the compound represented by the general formula (IIC) comprises compounds represented by the general formulas (IIC-1), (IIC-2), (IIC-4), (IIC-5), (IIC-6) or (IIC-8):

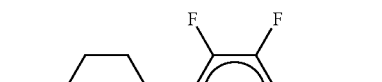
(IIC-1)

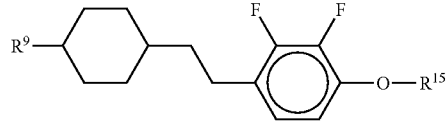
(IIC-2)

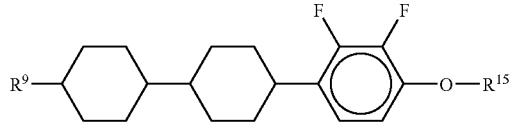
(IIC-4)

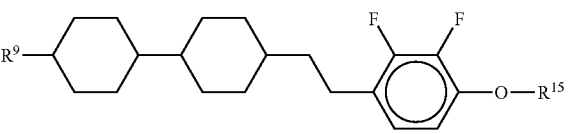
(IIC-5)

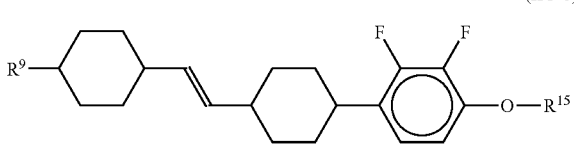
(IIC-6)

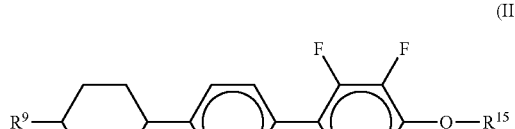
(IIC-8)

wherein $R^9$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, and one or more $CH_2$ groups, which are represent in said alkyl group, said alkoxy group, said alkenyl group or said alkenyloxy group, may be substituted with —O—, —CO—, or —COO—, while O atoms do not bond with each other directly, and $R^5$ represents an alkyl group having 1 to 10 carbon atoms or an alkenyl group having 2 to 10 carbon atoms.

20. The nematic liquid crystal composition according to claim 3, wherein the compound represented by the general formula (IID) comprises compounds represented by the general formulas (IID-1) to (IID-3):

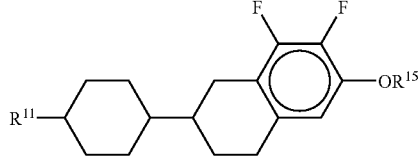
(IID-1)

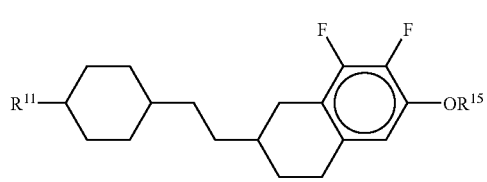
(IID-2)

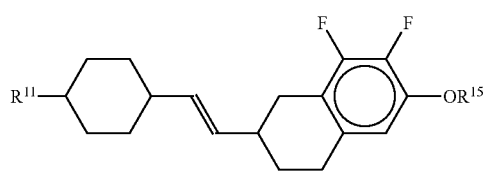
(IID-3)

wherein $R^{11}$ represents analkyl group having 1 to 10 carbon atoms, an alkoxy group having 1 to 10 carbon atoms, an alkenyl group having 2 to 10 carbon atoms, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, and $R^{15}$ represents an alkyl group having 1 to 10 carbon atoms or an alkenyl group having 2 to 10 carbon atoms.

21. The nematic liquid crystal composition according to claim 3, wherein the compound represented by the general formula (III) comprises compounds represented by the general formulas (III-1) to (III-22):

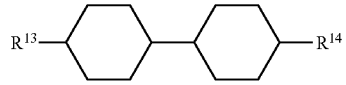
(III-1)

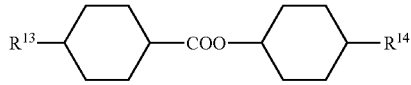
(III-2)

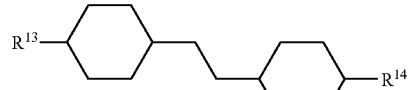
(III-3)

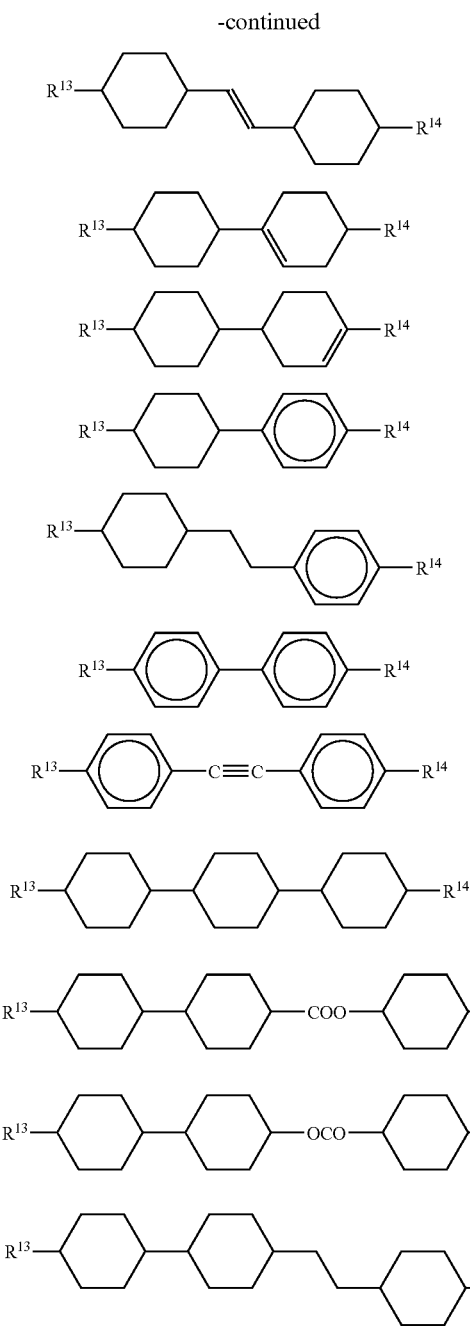
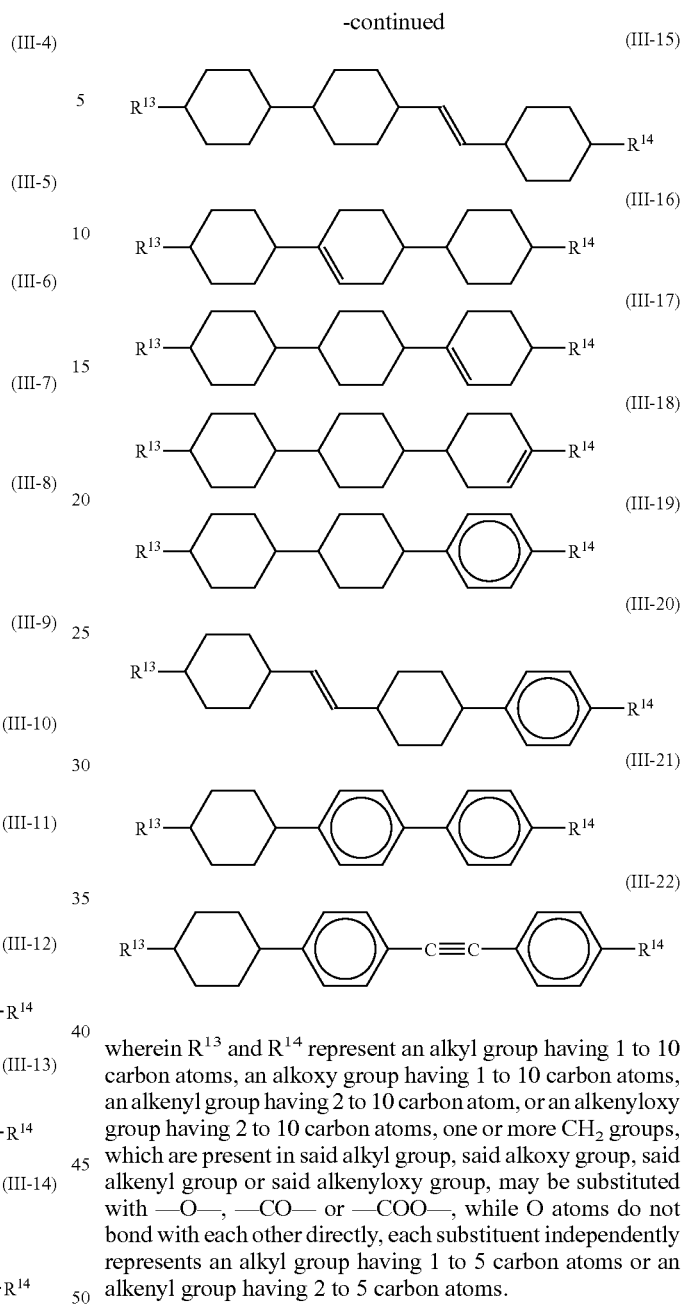

wherein $R^{13}$ and $R^{14}$ represent an alkyl group having 1 to 10 carbon atoms, an alkoxy group having 1 to 10 carbon atoms, an alkenyl group having 2 to 10 carbon atom, or an alkenyloxy group having 2 to 10 carbon atoms, one or more $CH_2$ groups, which are present in said alkyl group, said alkoxy group, said alkenyl group or said alkenyloxy group, may be substituted with —O—, —CO— or —COO—, while O atoms do not bond with each other directly, each substituent independently represents an alkyl group having 1 to 5 carbon atoms or an alkenyl group having 2 to 5 carbon atoms.

* * * * *